United States Patent
Feng et al.

(10) Patent No.: US 12,222,582 B2
(45) Date of Patent: Feb. 11, 2025

(54) OPTICAL IMAGING LENS ASSEMBLY

(71) Applicant: ZHEJIANG SUNNY OPTICS CO.,LTD., Zhejiang (CN)

(72) Inventors: Yudi Feng, Zhejiang (CN); Yi Zhang, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

(*) Notice: Subject to any disclaimer, the term of this patent is extended or adjusted under 35 U.S.C. 154(b) by 534 days.

(21) Appl. No.: 17/577,047

(22) Filed: Jan. 17, 2022

(65) Prior Publication Data

US 2022/0269050 A1  Aug. 25, 2022

(30) Foreign Application Priority Data

Feb. 22, 2021  (CN) .......................... 202110196091.0

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC .............................. G02B 13/0045; G02B 9/62
See application file for complete search history.

(56) References Cited

U.S. PATENT DOCUMENTS

2019/0154967 A1* 5/2019 Son ..................... G02B 27/0037
2020/0393654 A1* 12/2020 Shin ................... G02B 13/0045

FOREIGN PATENT DOCUMENTS

CN          108519634 A *  9/2018  ............... G02B 1/00

* cited by examiner

*Primary Examiner* — George G. King
(74) *Attorney, Agent, or Firm* — Samson G. Yu

(57) ABSTRACT

The disclosure provides an optical imaging lens assembly, which sequentially includes from an object side to an image side along an optical axis: a first lens; a second lens with a negative refractive power; a third lens, an image-side surface thereof is a convex surface; a fourth lens with a negative refractive power, an object-side surface thereof is a concave surface, and an image-side surface thereof is a concave surface; a fifth lens; and a sixth lens; wherein TTL is an on-axis distance from an object-side surface of the first lens to an imaging surface, ImgH is a half of a diagonal length of an effective pixel region on the imaging surface, and TTL and ImgH satisfy: TTL/ImgH≤1.35; an effective focal length f3 of the third lens and an effective focal length f of an optical imaging lens assembly satisfy: $2.5 \leq f3/f \leq 4.0$.

19 Claims, 13 Drawing Sheets

OPTICAL IMAGING LENS ASSEMBLY

CROSS-REFERENCE TO RELATED PRESENT INVENTION(S)

The disclosure claims priority to and the benefit of Chinese Patent Present invention No. 202110196091.0, filed in the China National Intellectual Property Administration (CNIPA) on 22 Feb. 2021, which is incorporated herein by reference in its entirety.

TECHNICAL FIELD

The disclosure relates to the technical field of optical imaging, and particularly relates to an optical imaging lens assembly including six lenses.

BACKGROUND

With the rapid development of the semiconductor industry, the performance of electronic photosensitive elements has been rapidly improved, pixels have been increased, requirements on imaging quality have also increased, and consequently, great challenges have been brought to the design of optical lens assemblies. At present, intelligent devices taking intelligent terminals as main carriers compete intensively in terms of photographing, and more diversified requirements are made to optical lens assemblies, not only on the maximal reduction of sizes but also on relatively high imaging effects. It is unlikely to balance requirements on the imaging quality, production efficiency, production cost or the like of existing imaging lens assemblies, which brings great challenges to manufacturers of lens assemblies.

Therefore, a optical imaging lens assembly with six lenses, having the characteristics of large image surface, large aperture, ultra-thin design and the like is needed to satisfy design requirements of manufacturers of intelligent devices.

SUMMARY

The disclosure is intended to provide an optical imaging lens assembly including six lenses, which has the characteristics of large image surface, large aperture, ultra-thin design and the like and satisfies design requirements of manufacturers of intelligent devices.

An embodiment of the disclosure provides an optical imaging lens assembly, which sequentially includes from an object side to an image side along an optical axis: a first lens; a second lens with a negative refractive power; a third lens, an image-side surface thereof is a convex surface; a fourth lens with a negative refractive power, an object-side surface thereof is a concave surface, and an image-side surface thereof is a concave surface; a fifth lens; and a sixth lens.

Wherein, TTL is an on-axis distance from an object-side surface of the first lens to an imaging surface, ImgH is a half of a diagonal length of an effective pixel region on the imaging surface, and TTL and ImgH satisfy: TTL/ImgH≤1.35; an effective focal length f3 of the third lens and an effective focal length f of an optical imaging lens assembly satisfy: 2.5≤f3/f≤4.0.

In an implementation mode, a curvature radius R3 of an object-side surface of the second lens and the effective focal length f of the optical imaging lens assembly satisfy: |R3/f|≤1.55.

In an implementation mode, an effective focal length f1 of the first lens, an effective focal length f2 of the second lens, the effective focal length f3 of the third lens and the effective focal length f of the optical imaging lens assembly satisfy: 6.5≤|f1/f|+|f2/f|+|f3/f|≤11.5.

In an implementation mode, an effective focal length f2 of the second lens and an effective focal length f1 of the first lens satisfy: −6.0≤f2/f1≤−2.5.

In an implementation mode, the effective focal length f3 of the third lens and a curvature radius R5 of an object-side surface of the third lens satisfy: |f3/R5|≤1.5.

In an implementation mode, a center thickness CT3 of the third lens on the optical axis and an air space T34 between the third lens and the fourth lens on the optical axis satisfy: 0.5≤CT3/T34≤2.5.

In an implementation mode, ΣCT is a sum of center thicknesses of all the lenses on the optical axis, ΣAT is a sum of air spaces between any two adjacent lenses with refractive power in the first lens to the lens closest to the imaging surface on the optical axis, ΣCT and ΣAT satisfy: 1.0≤ΣCT/ΣAT≤2.5.

In an implementation mode, Semi-FOV is a half of a maximum field of view of the optical imaging lens assembly, and the effective focal length f of the optical imaging lens assembly and Semi-FOV satisfy: 4.0 mm≤f×tan(Semi-FOV)≤5.5 mm.

In an implementation mode, SAG41 is an on-axis distance between an intersection point of the object-side surface of the fourth lens and the optical axis to an effective radius vertex of the object-side surface of the fourth lens, SAG31 is an on-axis distance between an intersection point of an object-side surface of the third lens and the optical axis to an effective radius vertex of the object-side surface of the third lens, and SAG41 and SAG31 satisfy 1.5≤SAG41/SAG31≤4.0.

In an implementation mode, a center thickness CT3 of the third lens on the optical axis and an edge thickness ET3 of the third lens satisfy 1.5≤CT3/ET3≤2.5.

In an implementation mode, SAG41 is an on-axis distance between an intersection point of the object-side surface of the fourth lens and the optical axis to an effective radius vertex of the object-side surface of the fourth lens, SAG42 is an on-axis distance between an intersection point of the image-side surface of the fourth lens and the optical axis to an effective radius vertex of the image-side surface of the fourth lens, and SAG41, SAG42 and a center thickness CT4 of the fourth lens on the optical axis satisfy 1.5≤|SAG41+SAG42|/CT4≤3.0.

In an implementation mode, an object-side surface of the sixth lens is a convex surface, and an image-side surface of the sixth lens is a concave surface.

Another embodiment of the disclosure provides an optical imaging lens assembly, which sequentially includes from an object side to an image side along an optical axis: a first lens; a second lens with a negative refractive power; a third lens with a positive refractive power, an image-side surface thereof is a convex surface; a fourth lens with a negative refractive power, an object-side surface thereof is a concave surface, and an image-side surface thereof is a concave surface; a fifth lens; and a sixth lens.

Wherein, the lenses are independent of each other. There is an air space between each lens on the optical axis. TTL is an on-axis distance from an object-side surface of the first lens to an imaging surface, ImgH is a half of a diagonal length of an effective pixel region on the imaging surface, and TTL and ImgH satisfy: TTL/ImgH≤1.35; a curvature radius R3 of an object-side surface of the second lens and an effective focal length f of an optical imaging lens assembly satisfy: |R3/f|≤1.55. An effective focal length f1 of the first lens, an effective focal length f2 of the second lens, an effective focal length f3 of the third lens and the effective focal length f of the optical imaging lens assembly satisfy: $6.5 \leq |f1/f| + |f2/f| + |f3/f| \leq 11.5$.

The disclosure has the following beneficial effects.

The optical imaging lens assembly provided in the disclosure includes multiple lenses, e.g., the first lens to the sixth lens. According to the optical imaging lens assembly of the disclosure, a ratio of an optical total length of the system to a half of an image height is beneficial to keep ultrathin when the lens has a sufficiently large imaging surface, achieve high imaging quality and miniaturization, and have the characteristics of large image surface, large aperture, ultra-thin design and the like and satisfy design requirements of manufacturers of intelligent devices.

BRIEF DESCRIPTION OF THE DRAWINGS

In order to describe the technical solutions in the embodiments of the disclosure more clearly, the drawings required to be used for describing the embodiments will be simply introduced below. It is apparent that the drawings described below are only some embodiments of the disclosure. Those skilled in the art may further obtain other drawings according to these drawings without creative work.

DETAILED DESCRIPTION OF THE EMBODIMENTS

Figure 1:
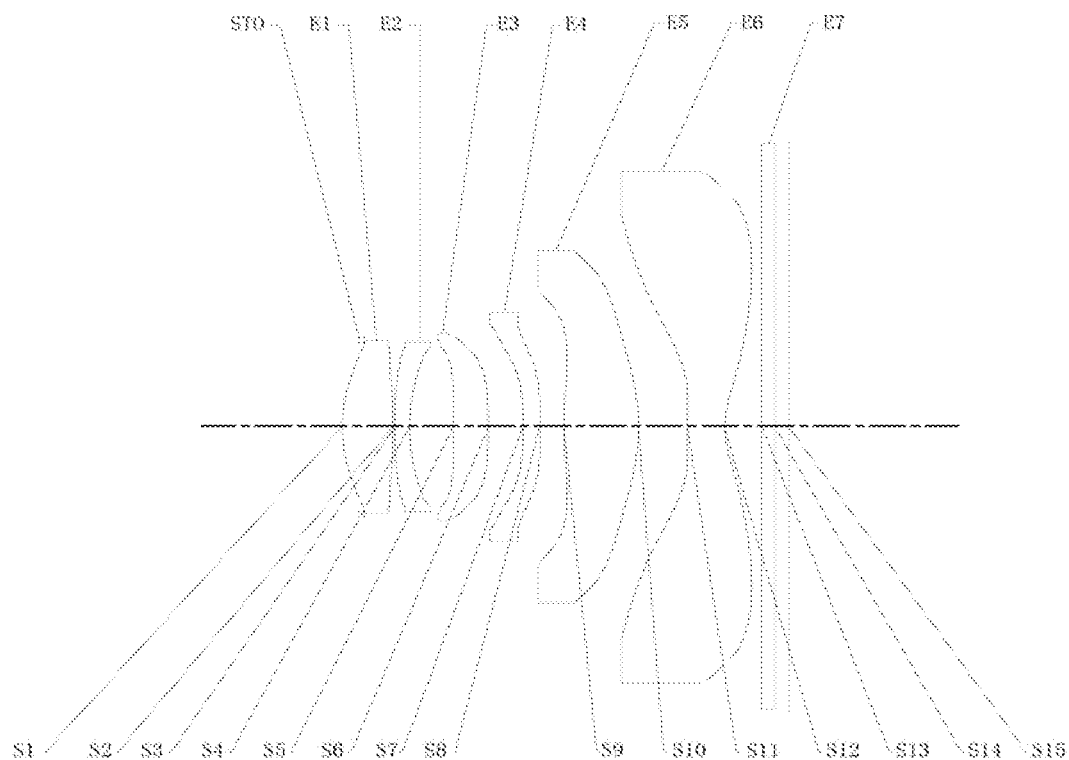
FIG. 1 shows a structural schematic diagram of a lens group of an optical imaging lens assembly according to Embodiment 1 of the disclosure.

The technical solutions in embodiments of the disclosure will be described clearly and completely below in combination with the drawings in the embodiments of the disclosure. It is apparent that the described embodiments are not all but only part of embodiments of the disclosure. All other embodiments obtained by those skilled in the art based on the embodiments in the disclosure without creative work shall fall within the scope of protection of the disclosure.

It should be noted that, in this description, expressions first, second, third and the like are only used to distinguish one feature from another feature and do not represent any limitation to the feature. Thus, a first lens discussed below may also be referred to as a second lens or a third lens without departing from the teachings of the disclosure.

It should also be understood that terms "include", "including", "have", "contain", and/or "containing", used in the specification, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the disclosure are described, "may" is used to represent "one or more implementation modes of the disclosure". Furthermore, term "exemplary" refers to an example or exemplary description.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

In the description of the disclosure, a paraxial region refers to a region nearby an optical axis. If a surface of a lens is a convex surface and a position of the convex surface is not defined, it indicates that at least a paraxial region of the surface of the lens is a convex surface. If a surface of a lens is a concave surface and a position of the concave surface is not defined, it indicates that at least a paraxial region of the surface of the lens is a concave surface. A surface, closest to a shot object, of each lens is called an object-side surface of the lens, and a surface, closest to an imaging surface, of each lens is called an image-side surface of the lens.

Unless otherwise defined, all terms (including technical terms and scientific terms) used in the disclosure have the same meanings as commonly understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and features in the embodiments may be combined without conflicts. The features, principles and other aspects of the disclosure will be described in detail below with reference to the drawings and in combination with embodiments.

Exemplary Embodiments

An optical imaging lens assembly of the exemplary embodiment of the disclosure includes six lenses, sequentially including from an object side to an image side along an optical axis: a first lens, a second lens, a third lens, a fourth lens, a fifth lens and a sixth lens. The lenses are independent of each other. There is an air space between each lens on the optical axis.

In an exemplary embodiment, the first lens has a refractive power. The second lens has a negative refractive power. The third lens may have a positive refractive power or a negative refractive power, an image-side surface thereof is a convex surface. The fourth lens has a negative refractive power, an object-side surface thereof is a concave surface, and an image-side surface thereof is a concave surface. The fifth lens may have a positive refractive power or a negative refractive power. The sixth lens may have a positive refractive power or a negative refractive power.

In an exemplary embodiment, TTL is an on-axis distance from an object-side surface of the first lens to an imaging surface, ImgH is a half of a diagonal length of an effective pixel region on the imaging surface, and TTL and ImgH satisfy a conditional expression: TTL/ImgH≤1.35. A ratio of an optical total length of the system to a half of an image height is beneficial to keep ultrathin when the lens has a sufficiently large imaging surface, achieve high imaging quality and miniaturization. More specifically, 1.25≤TTL/ImgH≤1.35, e.g., 1.26≤TTL/ImgH≤1.34, is satisfied.

In an exemplary embodiment, an effective focal length f3 of the third lens and an effective focal length f of the optical imaging lens assembly satisfy a conditional expression: 2.55≤f3/f≤4.0. A ratio of the effective focal length of the third lens to the effective focal length of the system is controlled in a reasonable range, so that an on-axis aberration and an off-axis aberration are balanced, and the imaging quality is ensured. More specifically, 2.7≤f3/f≤4.0, e.g., 2.72≤f3/f≤4.00, is satisfied.

In an exemplary embodiment, a curvature radius R3 of an object-side surface of the second lens and an effective focal length f of the optical imaging lens assembly satisfy a conditional expression: |R3/f|≤1.55. A ratio of the curvature radius of the object-side surface of the second lens to the effective focal length of the system is controlled, so that astigmatism of the system may be controlled, and the imaging quality in an off-axis field of view may be improved. More specifically, 0.5≤|R3/f|≤1.52, e.g., 0.59≤|R3/f|≤1.50, is satisfied.

In an exemplary embodiment, an effective focal length f1 of the first lens, an effective focal length f2 of the second lens, an effective focal length f3 of the third lens and an effective focal length f of the optical imaging lens assembly satisfy a conditional expression: 6.5≤|f1/f|+|f2/f|+|f3/f|≤11.5. A sum of absolute values of ratios of the effective focal lengths of the first lens, the second lens and the third lens to the effective focal length of the system is controlled, so that the refractive power configuration of the system is balanced, and the sensitivity of the system is reduced. More specifically, 6.8≤|f1/f|+|f2/f|+|f3/f|≤11.2, e.g., 6.87≤|f1/f|+|f2/f|+|f3/f|≤11.12, is satisfied.

In an exemplary embodiment, an effective focal length f2 of the second lens and an effective focal length f1 of the first lens satisfy a conditional expression: −6.05≤f2/f1≤−2.5. A ratio of the effective focal lengths of the second lens and the first lens is controlled, so that a field curvature of the system is effectively controlled, and the imaging quality is ensured. More specifically, −5.5≤f2/f1≤−2.8, e.g., −5.32≤f2/f1≤−2.83, is satisfied.

In an exemplary embodiment, an effective focal length f3 of the third lens and a curvature radius R5 of an object-side surface of the third lens satisfy a conditional expression: |f3/R5|≤1.5. A ratio of the effective focal length of the third lens to the curvature radius of the object-side surface of the third lens is restricted, so that surface types of the third lens may be improved, and the sensitivity of the system to the third lens may be reduced. More specifically, 0.2≤|f3/R5|≤1.4, e.g., 0.28≤|f3/R5|≤1.38, is satisfied.

In an exemplary embodiment, a center thickness CT3 of the third lens on the optical axis and an air space T34 between the third lens and the fourth lens on the optical axis satisfy a conditional expression: 0.5≤CT3/T34≤2.5. A range of a ratio of the center thickness of the third lens to the on-axis space between the third and fourth lenses is controlled, so that the machinability of the system may be ensured, and the production cost may be reduced. More specifically, 0.9≤CT3/T34≤2.1, e.g., 0.93≤CT3/T34≤2.08, is satisfied.

In an exemplary embodiment, ΣCT is a sum of center thicknesses of all the lenses on the optical axis, ΣAT is a sum of air spaces between any two adjacent lenses with refractive power in the first lens to the lens closest to the imaging surface on the optical axis, and ΣCT and ΣAT satisfy a conditional expression: 1.0≤ΣCT/ΣAT≤2.5. A ratio of the sum of the center thicknesses of the lenses to the sum of the spaces between the lenses is controlled, so that the thickness of the lens may be controlled effectively, the size of the lens may be reduced, and the weight of the lens may be reduced. More specifically, 1.4≤ΣCT/ΣAT≤2.2, e.g., 1.46≤ΣCT/ΣAT≤2.14, is satisfied.

In an exemplary embodiment, Semi-FOV is a half of a maximum field of view of the optical imaging lens assembly, and an effective focal length f of the optical imaging lens assembly and Semi-FOV satisfy a conditional expression: 4.0 mm≤f×tan(Semi-FOV)≤5.5 mm. A product of the effective focal length of the system and a tangent value of a half of the field of view is controlled, so that it may be ensured that the system has a large enough image surface, and the imaging quality is ensured. More specifically, 4.64 mm≤f×tan(Semi-FOV)≤5.2 mm, e.g., 4.64 mm≤f×tan(Semi-FOV)≤5.12 mm, is satisfied.

In an exemplary embodiment, SAG41 is an on-axis distance from an intersection point of an object-side surface of the fourth lens and the optical axis to an effective radius vertex of the object-side surface of the fourth lens, SAG31 is an on-axis distance from an intersection point of an object-side surface of the third lens and the optical axis to an effective radius vertex of the object-side surface of the third lens, and SAG41 and SAG31 satisfy a conditional expression: 1.5≤SAG41/SAG31≤4.0. A ratio of a vector height of the object-side surface of the fourth lens to a vector height of the object-side surface of the third lens is controlled, so that the machinability of the lens may be ensured, and meanwhile, the imaging quality of an entrance pupil edge light of is ensured. More specifically, 1.7≤SAG41/SAG31≤3.9, e.g., 1.71≤SAG41/SAG31≤3.83, is satisfied.

In an exemplary embodiment, a center thickness CT3 of the third lens on the optical axis and an edge thickness ET3 of the third lens satisfy a conditional expression: 1.5≤CT3/ET3≤2.5. A ratio of the on-axis center thickness and edge thickness of the third lens is controlled, so that the uniformity of the third lens is ensured, the machinability is further ensured, and meanwhile, the sensitivity of the system to the third lens is reduced. More specifically, 1.7≤CT3/ET3≤2.4, e.g., 1.73≤CT3/ET3≤2.35, is satisfied.

In an exemplary embodiment, SAG41 is an on-axis distance from an intersection point of an object-side surface of the fourth lens and the optical axis to an effective radius vertex of the object-side surface of the fourth lens, SAG42 is an on-axis distance from an intersection point of an image-side surface of the fourth lens and the optical axis to an effective radius vertex of the image-side surface of the fourth lens, and SAG41, SAG42 and a center thickness CT4 of the fourth lens on the optical axis satisfy a conditional expression: 1.5≤|SAG41+SAG42|/CT4≤3.0. A ratio of a sum of a vector height of the object-side surface and a vector height of the image-side surface of the fourth lens to the center thickness of the fourth lens is controlled, so that the machinability of the fourth lens may be ensured, and the sensitivity of the system may be reduced. More specifically, 1.9≤|SAG41+SAG42|/CT4≤2.95, e.g., 1.93≤|SAG41+SAG42|/CT4≤2.92, is satisfied.

In an exemplary embodiment, an object-side surface of the sixth lens is a convex surface, and an image-side surface of the sixth lens is a concave surface. The form of the sixth lens is controlled to be the convex object-side surface and the concave image-side surface, so that a depth of field of the lens may be improved effectively, and a range of an effective imaging object distance of the lens may be widened.

In an exemplary embodiment, the optical imaging lens assembly may further include a diaphragm. The diaphragm may be arranged at an appropriate position as required. For example, the diaphragm may be arranged between the object side and the first lens. In an embodiment, the optical imaging lens assembly may further include an optical filter configured to correct the chromatic aberration and/or a protective glass configured to protect a photosensitive element on the imaging surface.

The optical imaging lens assembly according to the embodiment of the disclosure may adopt multiple lenses, for example, the above-mentioned six. The refractive power and surface types of each lens, the center thickness of each lens, on-axis spacing distances between the lenses and the like are configured reasonably to endow the optical imaging lens assembly with a relatively large imaging surface and the characteristics of wide imaging range and high imaging quality and ensure an ultra-thin design of a mobile phone.

In an exemplary embodiment, at least one of mirror surfaces of each lens is an aspheric mirror surface. That is, at least one mirror surface in the object-side surface of the first lens to the image-side surface of the sixth lens is an aspheric mirror surface. An aspheric lens has such a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. In an embodiment, at least one of the object-side surface and image-side surface of each lens in the first lens, the second lens, the third lens, the fourth lens, the fifth lens and the sixth lens is an aspheric mirror surface. In another embodiment, both the object-side surface and the image-side surface of each lens in the first lens, the second lens, the third lens, the fourth lens, the fifth lens and the sixth lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the embodiment with six lenses as an example, the optical imaging lens assembly is not limited to six lenses. If necessary, the optical imaging lens assembly may also include another number of lenses.

Specific embodiments applicable to the optical imaging lens assembly of the above-mentioned embodiment will further be described below with reference to the drawings.

Embodiment 1

FIG. 1 shows a structural schematic diagram of a lens group of an optical imaging lens assembly according to Embodiment 1 of the disclosure. The optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially passes through each of the surfaces from S1 to S14, and is finally imaged on the imaging surface S15.

Table 1 shows a basic parameter table of the optical imaging lens assembly of Embodiment 1, wherein the units of the curvature radius, the thickness and the focal length are all millimeters (mm).

TABLE 1

| Surface number | Surface type | Curvature radius | Thickness/ distance | Focal length | Refractive index | Abbe number | Conic coefficient |
|---|---|---|---|---|---|---|---|
| OBJ | Spherical | Infinite | Infinite | | | | |
| STO | Spherical | Infinite | −0.5134 | | | | |
| S1 | Aspheric | 2.3363 | 0.8444 | 5.67 | 1.55 | 56.1 | −0.0004 |
| S2 | Aspheric | 8.3188 | 0.3045 | | | | 9.4140 |
| S3 | Aspheric | −6.1103 | 0.2350 | −17.15 | 1.68 | 19.2 | −83.0326 |
| S4 | Aspheric | −13.0838 | 0.3645 | | | | −99.0000 |
| S5 | Aspheric | 15.6857 | 0.4870 | 18.29 | 1.55 | 56.1 | −41.4787 |
| S6 | Aspheric | −27.1639 | 0.4565 | | | | 47.4787 |
| S7 | Aspheric | −15.8093 | 0.3345 | −21.19 | 1.62 | 25.9 | 82.2414 |

TABLE 1-continued

| Surface number | Surface type | Curvature radius | Thickness/ distance | Focal length | Refractive index | Abbe number | Conic coefficient |
|---|---|---|---|---|---|---|---|
| S8 | Aspheric | 77.7754 | 0.5402 | | | | 27.7831 |
| S9 | Aspheric | 6.8325 | 1.2493 | 5.45 | 1.55 | 56.1 | 0.2790 |
| S10 | Aspheric | −4.9299 | 0.4488 | | | | −0.0390 |
| S11 | Aspheric | 6.5038 | 0.5790 | −4.04 | 1.54 | 55.6 | 0.1669 |
| S12 | Aspheric | 1.5752 | 0.6674 | | | | −0.9899 |
| S13 | Spherical | Infinite | 0.2100 | | 1.51 | 64.2 | |
| S14 | Spherical | Infinite | 0.2820 | | | | |
| S15 | Spherical | Infinite | | | | | |

As shown in Table 2, in Embodiment 1, a total effective focal length f of the optical imaging lens assembly is 5.5 mm. TTL is a distance from the object-side surface S1 of the first lens E1 to the imaging surface S15 of the optical imaging lens assembly on the optical axis, and TTL is 7.00 mm. ImgH is a half of a diagonal length of an effective pixel region of an electronic photosensitive element of the optical imaging lens assembly, and ImgH is 5.31 mm. Semi-FOV is a half of a maximum field of view of the optical imaging lens assembly, and Semi-FOV is 42.94°.

TABLE 2

Embodiment 1

| f(mm) | 5.5 | f1(mm) | 5.67 |
|---|---|---|---|
| TTL(mm) | 7.00 | ImgH(mm) | 5.31 |
| Semi-FOV(°) | 42.94 | Fno | 1.8 |
| TTL/ImgH | 1.32 | f3/f | 3.33 |
| IR3/fI | 1.11 | If1/fI + If2/fI + If3/fI | 7.47 |
| f2/f1 | −3.03 | If3/R5I | 1.17 |
| CT3/T34 | 1.07 | ΣCT/ΣAT | 1.76 |
| F*tan(Semi-FOV)(mm) | 5.12 | SAG41/SAG31 | 3.17 |
| CT3/ET3 | 1.73 | ISAG41 + SAG42I/CT4 | 2.91 |

The optical imaging lens assembly in Embodiment 1 satisfies:
TTL/ImgH=1.32, wherein TTL is the on-axis distance from the object-side surface of the first lens to the imaging surface, and ImgH is the half of the diagonal length of the effective pixel region on the imaging surface;
f3/f=3.33, wherein f3 is an effective focal length of the third lens, and f is an effective focal length of the optical imaging lens assembly;
IR3/f1I=1.11, wherein R3 is a curvature radius of the object-side surface of the second lens, and f is the effective focal length of the optical imaging lens assembly;
If1/fI+If2/fI+If3/fI=7.47, wherein f1 is an effective focal length of the first lens, f2 is an effective focal length of the second lens, f3 is the effective focal length of the third lens, and f is the effective focal length of the optical imaging lens assembly;
f2/f1=−3.03, wherein f2 is the effective focal length of the second lens, and f1 is the effective focal length of the first lens;
If3/R5I=1.17, wherein f3 is the effective focal length of the third lens, and R5 is a curvature radius of the object-side surface of the third lens;
CT3/T34=1.07, wherein CT3 is a center thickness of the third lens on the optical axis, and T34 is an air space between the third lens and the fourth lens on the optical axis;
ΣCT/ΣAT=1.76, wherein ΣCT is a sum of center thicknesses of all the lenses on the optical axis, and ΣAT is a sum of air spaces between any two adjacent lenses with refractive power in the first lens to the lens closest to the imaging surface on the optical axis;
f×tan(Semi-FOV)=5.12 mm, wherein f is the effective focal length of the optical imaging lens assembly, and Semi-FOV is the half of the maximum field of view of the optical imaging lens assembly;
SAG41/SAG31=3.17, wherein SAG41 is an on-axis distance from an intersection point of the object-side surface of the fourth lens and the optical axis to an effective radius vertex of the object-side surface of the fourth lens, and SAG31 is an on-axis distance from an intersection point of the object-side surface of the third lens and the optical axis to an effective radius vertex of the object-side surface of the third lens;
CT3/ET3=1.73, wherein CT3 is the center thickness of the third lens on the optical axis, and ET3 is an edge thickness of the third lens; and
ISAG41+SAG42I/CT4=2.91, wherein SAG41 is the on-axis, distance from the intersection point of the object-side surface of the fourth lens and the optical axis to the effective radius vertex of the object-side surface of the fourth, lens, SAG42 is an on-axis distance from an intersection point of the image-side surface of the fourth lens and the optical axis to an effective radius vertex of the image-side surface of the fourth lens, and CT4 is a center thickness of the fourth lens on the optical axis.

In Embodiment 1, both the object-side surface and the image-side surface of any lens in the first lens E1 to the sixth lens E6 are aspheric surfaces. A surface type x of each aspheric lens may be defined through, but not limited to, the following aspheric surface formula:

$$x = \frac{ch^2}{1+\sqrt{1-(k+1)c^2h^2}} + \Sigma A_i h^i, \quad (1)$$

wherein x is a vector height of a distance between the aspheric surface and a vertex of the aspheric surface when the aspheric surface is located at a position with the height h in the optical axis direction; c is a paraxial curvature of the aspheric surface, c=1/R (namely, the paraxial curvature c is a reciprocal of the curvature radius R in Table 1 above); k is a conic coefficient; and Ai is a correction coefficient of the i-th order of the aspheric surface.

In Embodiment 1, both the object-side surface and the image-side surface of any lens in the first lens E1 to the sixth lens E6 are aspheric surfaces. Table 3 shows high-order coefficients A4, A6, A8, A10, A12, A14, A16, A18, A20, A22, A24, A26, A28 and A30 that may be used for each of the aspheric mirror surfaces S1-S12 in Embodiment 1.

TABLE 3

| Surface number | A4 | A6 | A8 | A10 | A12 | A14 | A16 |
|---|---|---|---|---|---|---|---|
| S1 | −5.6196E−03 | −7.2049E−03 | −3.6756E−03 | −1.0565E−03 | −3.4020E−04 | −1.0132E−05 | −1.6178E−05 |
| S2 | −8.3259E−02 | −1.2351E−02 | −1.0955E−03 | −9.7336E−05 | −1.4589E−04 | −1.2933E−04 | −9.3715E−06 |
| S3 | 1.9172E−02 | 3.1446E−02 | 8.3003E−04 | 1.4877E−03 | −3.7501E−04 | −1.8506E−04 | −1.2064E−04 |
| S4 | 1.1304E−01 | 2.6421E−02 | 5.0725E−03 | 2.3025E−03 | 8.2008E−04 | 2.6578E−04 | 5.3801E−05 |
| S5 | −2.1379E−01 | −1.9442E−02 | −9.1477E−04 | 2.0693E−03 | 1.3647E−03 | 8.8495E−04 | 3.5723E−04 |
| S6 | −2.9188E−01 | −2.4091E−02 | −2.4020E−03 | 2.1204E−04 | −9.2569E−05 | 3.1626E−04 | 1.0221E−04 |
| S7 | −4.0728E−01 | 6.1813E−02 | 1.8471E−03 | −7.7782E−04 | −2.2580E−03 | 6.4033E−04 | 2.1952E−04 |
| S8 | −6.3208E−01 | 1.4769E−01 | −6.6345E−03 | −2.5085E−03 | −3.0088E−03 | 1.5957E−03 | −1.5747E−04 |
| S9 | −1.0697E+00 | 1.5254E−02 | 2.2799E−02 | 2.8723E−02 | −2.0722E−03 | −3.0072E−03 | −2.9142E−03 |
| S10 | 4.6210E−01 | −1.4317E−01 | −8.8286E−03 | 4.1477E−02 | −2.4651E−02 | 9.4895E−03 | −2.2223E−03 |
| S11 | −3.0434E+00 | 1.3082E+00 | −6.1176E−01 | 2.8365E−01 | −1.3429E−01 | 6.8074E−02 | −3.7128E−02 |
| S12 | −8.1861E+00 | 1.9758E+00 | −6.0681E−01 | 2.7862E−01 | −1.4451E−01 | 7.4439E−02 | −3.7394E−02 |

| Surface number | A18 | A20 | A22 | A24 | A26 | A28 | A30 |
|---|---|---|---|---|---|---|---|
| S1 | 2.6146E−05 | −3.2385E−06 | 1.2051E−05 | −3.3078E−06 | 4.4395E−06 | −7.0891E−06 | 1.4086E−06 |
| S2 | 3.9910E−05 | 5.7577E−05 | 2.9796E−05 | 1.2660E−05 | −4.2056E−06 | −4.8016E−06 | −6.5492E−06 |
| S3 | 1.5051E−05 | 3.9027E−05 | 3.5944E−05 | 1.2591E−05 | 4.5323E−06 | 1.2768E−07 | 2.8045E−07 |
| S4 | −4.3628E−06 | −1.3536E−05 | −3.2084E−06 | 1.7501E−06 | 2.5945E−06 | −3.0273E−06 | −4.0452E−06 |
| S5 | 1.6435E−04 | 3.0481E−05 | 1.1696E−05 | −1.3184E−05 | −3.1797E−06 | −7.4257E−06 | 1.6360E−06 |
| S6 | 7.5549E−05 | 6.1195E−06 | 1.5546E−05 | −1.3239E−07 | 5.2441E−06 | 1.3355E−06 | 1.7758E−06 |
| S7 | 2.1212E−05 | −7.4242E−05 | 2.2568E−05 | 5.6694E−06 | 1.1064E−05 | −3.5768E−06 | 3.8536E−06 |
| S8 | −3.5157E−04 | −1.5311E−04 | 4.8434E−05 | 1.2575E−05 | −3.3784E−06 | −3.6713E−06 | 2.9953E−06 |
| S9 | −9.2040E−05 | 4.2803E−04 | 3.7861E−04 | 4.9372E−05 | −5.0438E−05 | −6.5132E−05 | −3.3707E−05 |
| S10 | −1.6120E−03 | 5.2882E−04 | −6.7846E−04 | −1.7962E−04 | 3.0115E−04 | −1.1219E−04 | −2.3053E−05 |
| S11 | 1.8674E−02 | −7.3294E−03 | 2.1479E−03 | −7.5480E−05 | −4.8814E−04 | 3.9065E−04 | −1.3479E−04 |
| S12 | 1.9774E−02 | −1.0618E−02 | 4.5992E−03 | −2.4192E−03 | 1.4403E−03 | −8.3541E−04 | 6.1666E−04 |

Figure 2A:
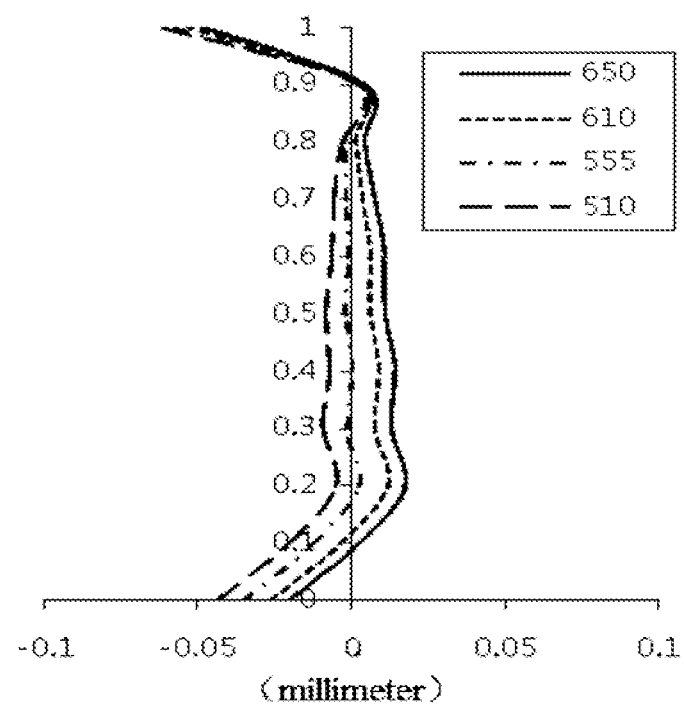
FIGS. 2a-2d show a longitudinal aberration curve, an astigmatism curve, a distortion curve and a lateral color curve of an optical imaging lens assembly according to Embodiment 1 of the disclosure respectively.
Figure 2B:
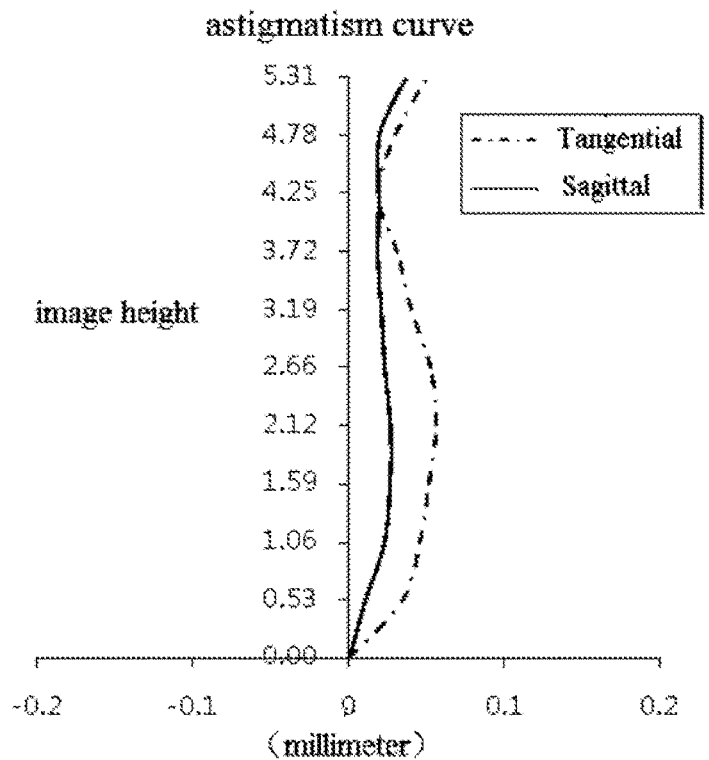
Figure 2C:
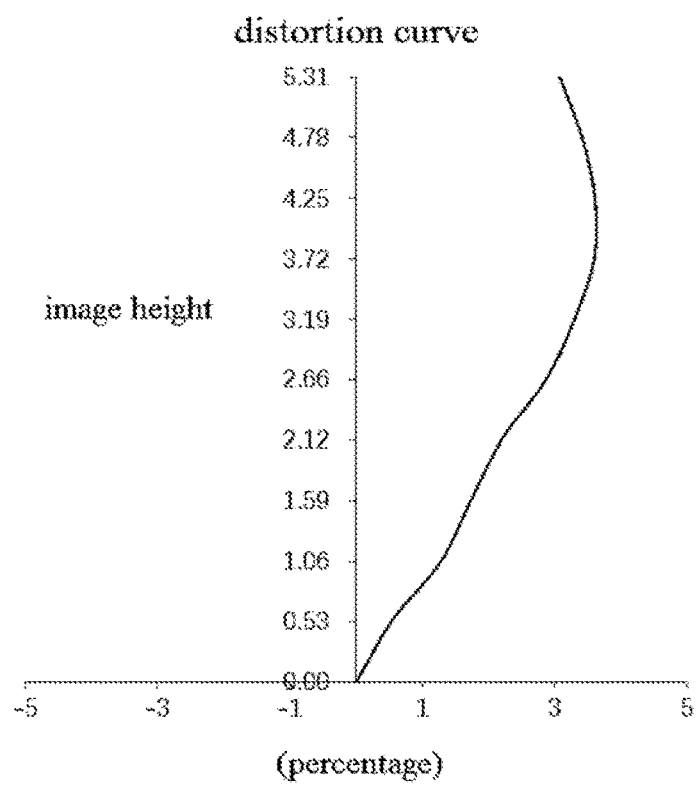
Figure 2D:
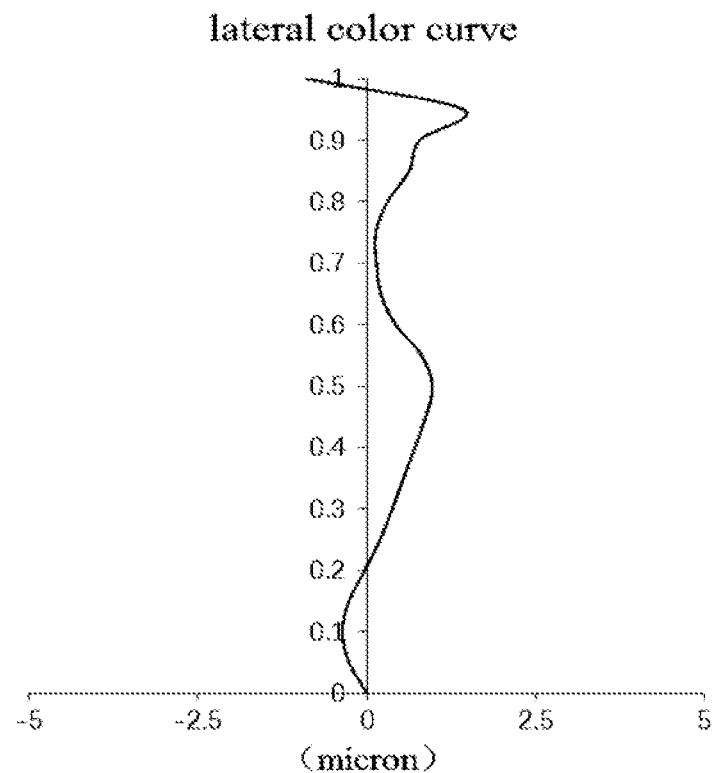

FIG. 2a shows a longitudinal aberration curve of the optical imaging lens assembly according to Embodiment 1 to represent deviations of a convergence focal point after light with different wavelengths passes through the lens. FIG. 2b shows an astigmatism curve of the optical imaging lens assembly according to Embodiment 1 to represent a tangential image surface curvature and a sagittal image surface curvature. FIG. 2c shows a distortion curve of the optical imaging lens assembly according to Embodiment 1 to represent distortion values corresponding to different image heights. FIG. 2d shows a lateral color curve of the optical imaging lens assembly according to Embodiment 1 to represent deviations of different image heights on the imaging surface after the light passes through the lens. According to FIGS. 2a-2d, it can be seen that the optical imaging lens assembly provided in Embodiment 1 may achieve high imaging quality.

Embodiment 2

Figure 3:
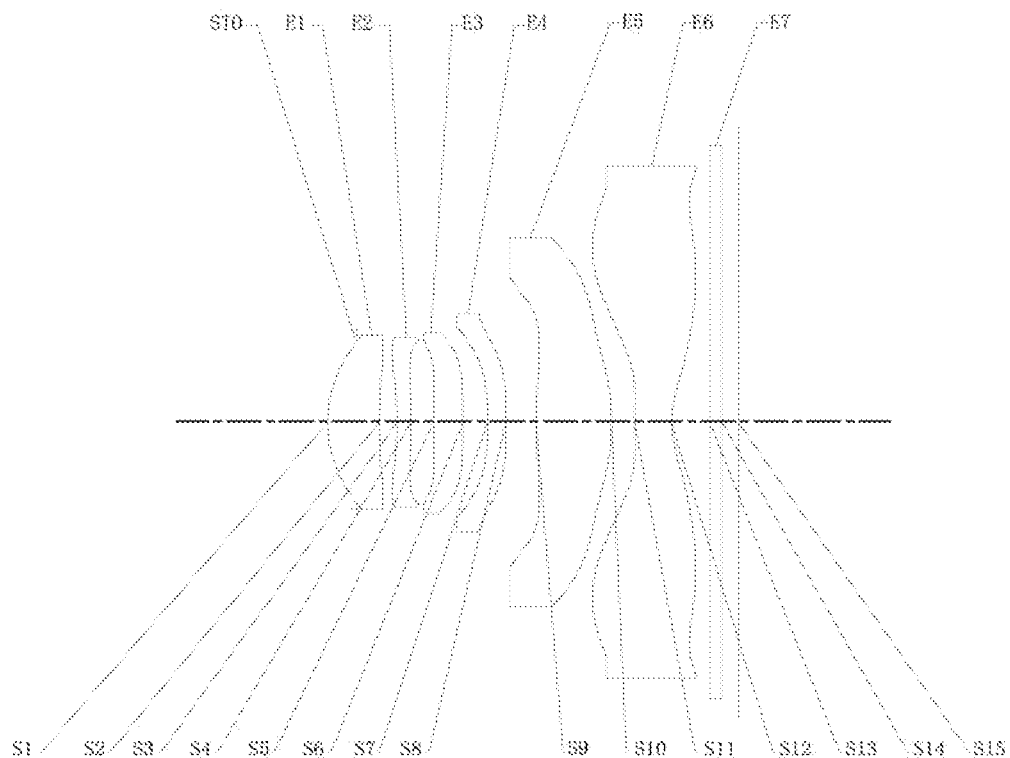
FIG. 3 shows a structural schematic diagram of a lens group of an optical imaging lens assembly according to Embodiment 2 of the disclosure.

FIG. 3 shows a structural schematic diagram of a lens group of an optical imaging lens assembly according to Embodiment 2 of the disclosure. The optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially passes through each of the surfaces from S1 to S14, and is finally imaged on the imaging surface S15.

Table 4 shows a basic parameter table of the optical imaging lens assembly of Embodiment 2, wherein the units of the curvature radius, the thickness and the focal length are all millimeters (mm).

TABLE 4

| Surface number | Surface type | Curvature radius | Thickness/ distance | Focal length | Refractive index | Abbe number | Conic coefficient |
|---|---|---|---|---|---|---|---|
| OBJ | Spherical | Infinite | Infinite | | | | |
| STO | Spherical | Infinite | −0.4602 | | | | |
| S1 | Aspheric | 2.3780 | 0.7975 | 6.09 | 1.55 | 56.1 | −0.1908 |
| S2 | Aspheric | 7.3517 | 0.4509 | | | | 4.8119 |
| S3 | Aspheric | −3.1727 | 0.2350 | −26.69 | 1.68 | 19.2 | −41.9740 |
| S4 | Aspheric | −3.9629 | 0.2367 | | | | −68.2377 |
| S5 | Aspheric | 14.1985 | 0.4603 | 18.20 | 1.55 | 56.1 | 65.4954 |
| S6 | Aspheric | −32.7268 | 0.4967 | | | | −99.0000 |

TABLE 4-continued

| Surface number | Surface type | Curvature radius | Thickness/ distance | Focal length | Refractive index | Abbe number | Conic coefficient |
|---|---|---|---|---|---|---|---|
| S7 | Aspheric | −18.4501 | 0.3492 | −25.93 | 1.62 | 25.9 | 79.2947 |
| S8 | Aspheric | 124.5809 | 0.6549 | | | | 99.0000 |
| S9 | Aspheric | 7.9193 | 1.2506 | 5.58 | 1.55 | 56.1 | 0.4037 |
| S10 | Aspheric | −4.6801 | 0.5617 | | | | −1.1725 |
| S11 | Aspheric | 7.7715 | 0.4218 | −3.90 | 1.54 | 55.6 | 0.3458 |
| S12 | Aspheric | 1.6187 | 0.6316 | | | | −0.9848 |
| S13 | Spherical | Infinite | 0.2100 | | 1.51 | 64.2 | |
| S14 | Spherical | Infinite | 0.2461 | | | | |
| S15 | Spherical | Infinite | | | | | |

As shown in Table 5, in Embodiment 2, a total effective focal length f of the optical imaging lens assembly is 5.42 mm. TTL is a distance from the object-side surface S1 of the first lens E1 to the imaging surface S15 of the optical imaging lens assembly on the optical axis, and TTL is 7.00 mm. ImgH is a half of a diagonal length of an effective pixel region of an electronic photosensitive element of the optical imaging lens assembly, and ImgH is 5.31 mm. Semi-FOV is a half of a maximum field of view of the optical imaging lens assembly, and Semi-FOV is 43.1°. Explanations about parameters of each relational expression are the same as those in Embodiment 1. Numerical values of each relational expression are listed in the following table.

TABLE 5

Embodiment 2

| f(mm) | 5.42 | f1(mm) | 6.09 |
|---|---|---|---|
| TTL(mm) | 7.00 | ImgH(mm) | 5.31 |

TABLE 5-continued

Embodiment 2

| Semi-FOV(°) | 43.1 | Fno | 1.8 |
|---|---|---|---|
| TTL/ImgH | 1.32 | f3/f | 3.36 |
| |R3/f| | 0.59 | |f1/f| + |f2/f| + |f3/f| | 9.41 |
| f2/f1 | −4.38 | |f3/R5| | 1.28 |
| CT3/T34 | 0.93 | ΣCT/ΣAT | 1.46 |
| fxtan(Semi-FOV)(mm) | 5.07 | SAG41/SAG31 | 3.83 |
| CT3/ET3 | 2.26 | |SAG41 + SAG42|/CT4 | 2.79 |

In Embodiment 2, both the object-side surface and the image-side surface of any lens in the first lens E1 to the sixth lens E6 are aspheric surfaces. Table 6 shows high-order coefficients A4, A6, A8, A10, A12, A14, A16, A18, A20, A22, A24, A26, A28 and A30 that may be used for each of the aspheric mirror surfaces S1-S12 in Embodiment 2.

TABLE 6

| Surface number | A4 | A6 | A8 | A10 | A12 | A14 | A16 |
|---|---|---|---|---|---|---|---|
| S1 | −1.4561E−02 | −1.0182E−02 | −3.6815E−03 | −6.4559E−04 | −1.8675E−04 | 4.6462E−05 | −2.1927E−05 |
| S2 | −9.2981E−02 | −1.5447E−02 | −2.4942E−04 | 6.5024E−05 | −1.5431E−04 | −1.4299E−04 | −2.6195E−05 |
| S3 | 2.4359E−02 | 4.8944E−02 | −4.4180E−03 | 2.1876E−03 | −1.5838E−03 | 5.5453E−05 | −2.8962E−04 |
| S4 | 1.2864E−01 | 5.1230E−02 | 2.1721E−03 | 2.9700E−03 | −5.8506E−04 | −2.9323E−05 | −3.5165E−04 |
| S5 | −2.1995E−01 | −2.8192E−02 | 3.2538E−03 | 3.7374E−03 | 2.4867E−03 | 1.3320E−03 | 4.9007E−04 |
| S6 | −3.3263E−01 | −3.5028E−02 | −1.3219E−03 | 1.0033E−03 | 2.2059E−04 | 4.6380E−04 | 1.1051E−04 |
| S7 | −4.4967E−01 | 7.7733E−02 | 4.9661E−03 | −3.0450E−03 | −4.2665E−03 | 4.7084E−04 | −1.1164E−04 |
| S8 | −6.4418E−01 | 1.6284E−01 | −8.7215E−03 | −6.1093E−03 | −5.3194E−03 | 1.1757E−03 | −7.0188E−04 |
| S9 | −1.0046E+00 | −8.0783E−03 | 6.1452E−03 | 3.3248E−02 | −2.1001E−03 | −4.3827E−03 | −4.2484E−03 |
| S10 | 4.4329E−01 | −2.0870E−01 | −2.5021E−02 | 5.1826E−02 | −1.9079E−02 | 5.4397E−03 | −3.7118E−03 |
| S11 | −2.8174E+00 | 1.1692E+00 | −4.9291E−01 | 2.1783E−01 | −1.0023E−01 | 4.9069E−02 | −2.7397E−02 |
| S12 | −7.8169E+00 | 1.8137E+00 | −5.4673E−01 | 2.6663E−01 | −1.4552E−01 | 7.4329E−02 | −3.3859E−02 |

| Surface number | A18 | A20 | A22 | A24 | A26 | A28 | A30 |
|---|---|---|---|---|---|---|---|
| S1 | 2.6445E−05 | −1.1859E−05 | 1.1768E−05 | −6.3766E−06 | 5.4865E−06 | −8.8547E−06 | 3.7524E−06 |
| S2 | −2.8471E−06 | 2.3281E−05 | 5.2538E−06 | 1.0593E−05 | −2.1352E−06 | 6.6367E−07 | −5.7196E−06 |
| S3 | 6.4869E−05 | −8.4457E−06 | 2.7223E−05 | −4.5395E−06 | 6.5492E−06 | −4.8190E−07 | 3.5822E−07 |
| S4 | −1.1831E−04 | −5.7999E−05 | −2.3685E−06 | 1.3225E−05 | 2.2546E−06 | 4.7444E−06 | −7.3105E−06 |
| S5 | 1.4390E−04 | −2.2782E−05 | −2.1608E−05 | −2.1831E−05 | 3.0382E−06 | 2.6890E−07 | 8.6536E−06 |
| S6 | −3.2382E−05 | −9.8739E−05 | −6.4063E−05 | −3.1101E−05 | −1.2051E−05 | −1.8176E−06 | −2.6924E−06 |
| S7 | −3.4285E−04 | −2.9315E−04 | −1.8582E−05 | −1.0509E−05 | −4.4764E−07 | −2.1853E−05 | −6.3462E−06 |
| S8 | −4.0846E−04 | 1.0359E−04 | 3.0029E−04 | 7.5195E−05 | −2.4192E−05 | −3.6506E−05 | −1.1624E−05 |
| S9 | −1.2304E−03 | 1.2836E−03 | 1.4185E−03 | 5.2896E−04 | −1.2791E−04 | −3.0075E−04 | −1.3452E−04 |
| S10 | −6.1382E−03 | 9.3620E−05 | 8.8192E−04 | 1.1750E−03 | 7.8758E−04 | 8.4180E−05 | −4.2630E−05 |
| S11 | 1.0140E−02 | −7.4700E−04 | 1.6388E−04 | −5.9742E−04 | −2.4644E−04 | 6.3548E−04 | −2.2486E−04 |
| S12 | 1.8083E−02 | −1.1576E−02 | 3.9241E−03 | −2.3012E−03 | 1.3536E−03 | −3.4893E−04 | 4.1151E−04 |

Figure 4A:
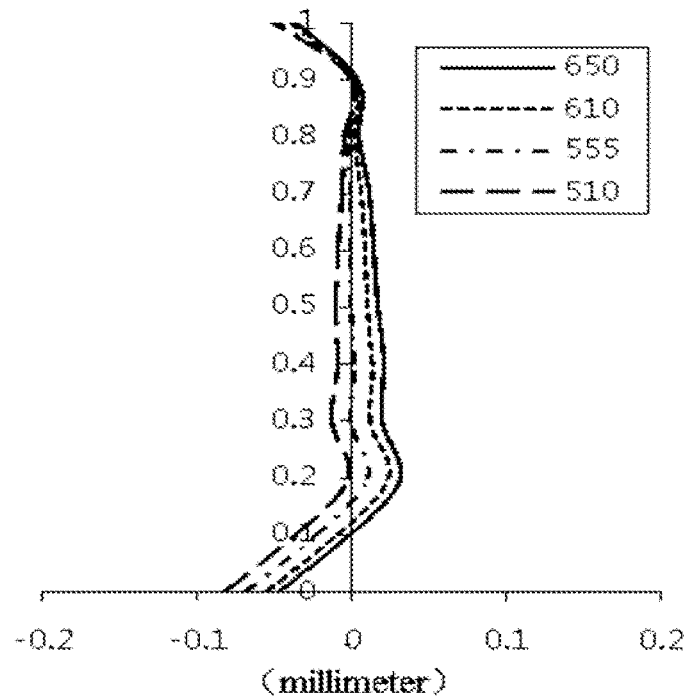
FIGS. 4a-4d show a longitudinal aberration curve, astigmatism curve, distortion curve and lateral color curve of an optical imaging lens assembly according to Embodiment 2 of the disclosure respectively.
Figure 4B:
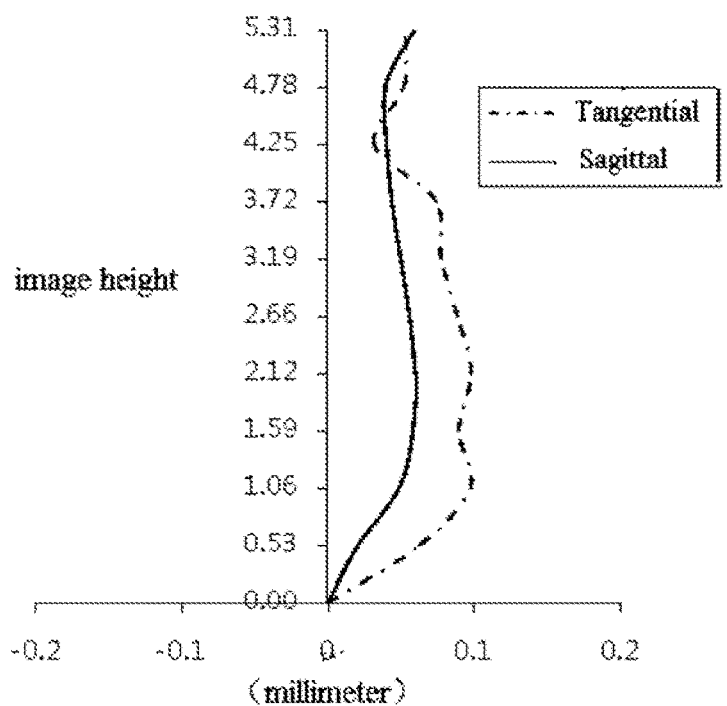
Figure 4C:
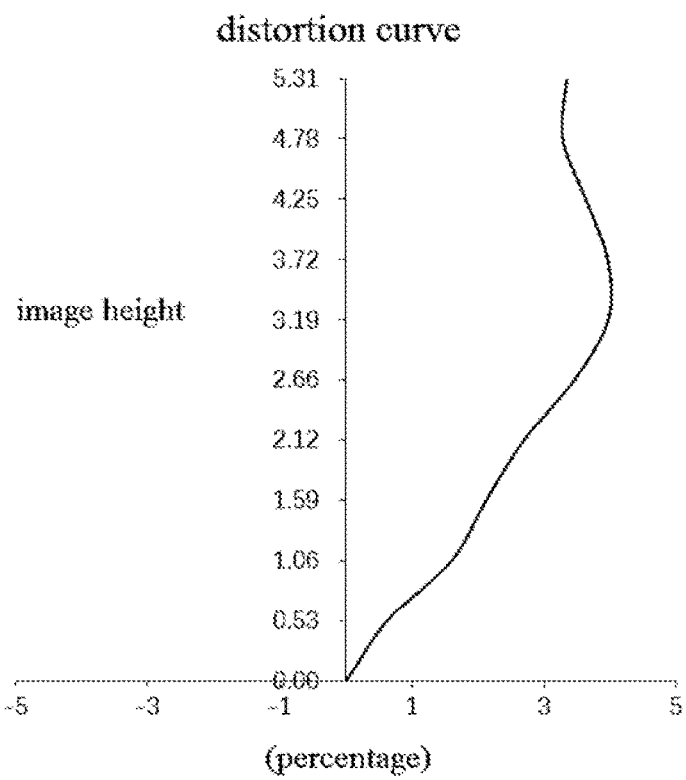
Figure 4D:
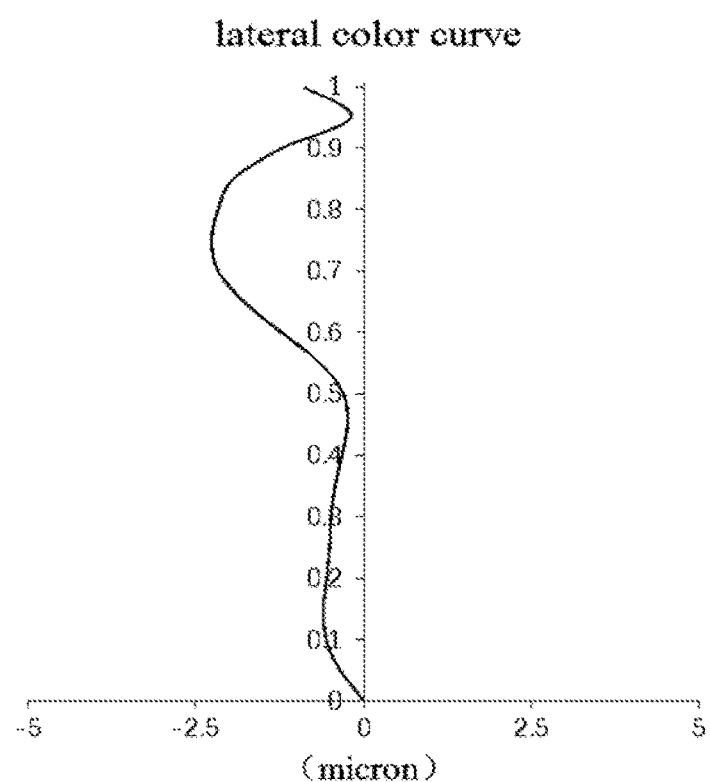

FIG. 4a shows a longitudinal aberration curve of the optical imaging lens assembly according to Embodiment 2 to represent deviations of a convergence focal point after light with different wavelengths passes through the lens. FIG. 4b shows an astigmatism curve of the optical imaging lens assembly according to Embodiment 2 to represent a tangential image surface curvature and a sagittal image surface curvature. FIG. 4c shows a distortion curve of the optical imaging lens assembly according to Embodiment 2 to represent distortion values corresponding to different image heights. FIG. 4d shows a lateral color curve of the optical imaging lens assembly according to Embodiment 2 to represent deviations of different image heights on the imaging surface after the light passes through the lens. According to FIGS. 4a-4d, it can be seen that the optical imaging lens assembly provided in Embodiment 2 may achieve high imaging quality.

Embodiment 3

Figure 5:
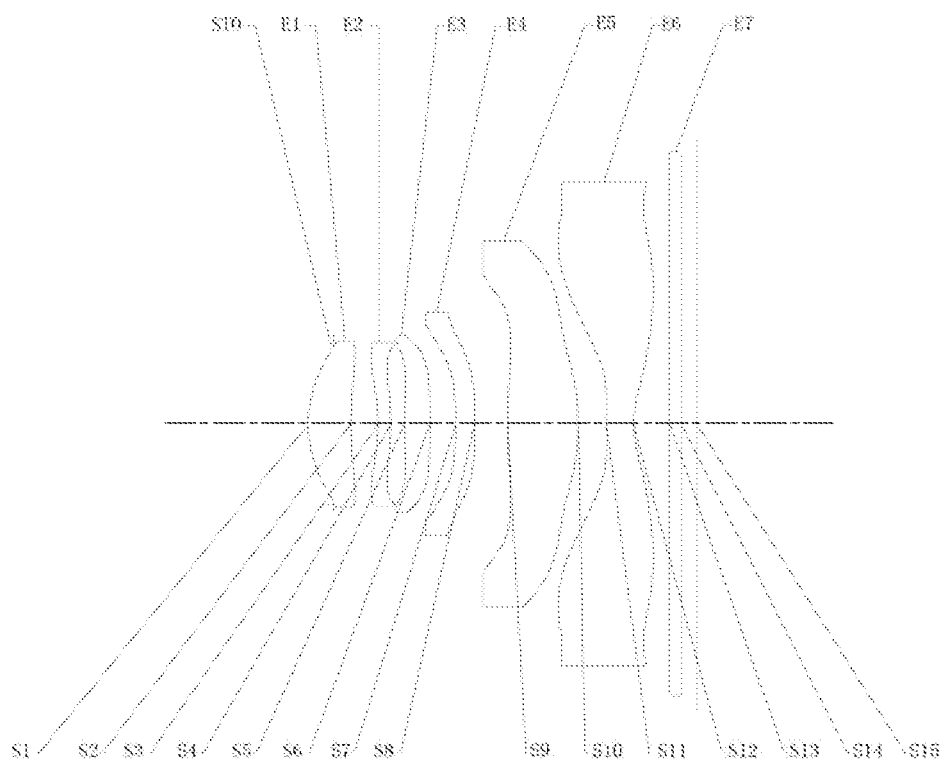
FIG. 5 shows a structural schematic diagram of a lens group of an optical imaging lens assembly according to Embodiment 3 of the disclosure.

FIG. 5 shows a structural schematic diagram of a lens group of an optical imaging lens assembly according to Embodiment 3 of the disclosure. The optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 thereof is a concave surface. The second lens E2 has a negative refractive power, an object-side surface S3 thereof is a concave surface, and an image-side surface S4 thereof is a convex surface. The third lens E3 has a positive refractive power, an object-side surface S5 thereof is a convex surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially passes through each of the surfaces from S1 to S14, and is finally imaged on the imaging surface S15.

Table 7 shows a basic parameter table of the optical imaging lens assembly of Embodiment 3, wherein the units of the curvature radius, the thickness and the focal length are all millimeters (mm).

TABLE 7

| Surface number | Surface type | Curvature radius | Thickness/ distance | Focal length | Refractive index | Abbe number | Conic coefficient |
|---|---|---|---|---|---|---|---|
| OBJ | Spherical | Infinite | Infinite | | | | |
| STO | Spherical | Infinite | −0.4579 | | | | |
| S1 | Aspheric | 2.4026 | 0.7771 | 6.15 | 1.55 | 56.1 | −0.2015 |
| S2 | Aspheric | 7.4821 | 0.4991 | | | | 7.7694 |
| S3 | Aspheric | −3.2791 | 0.2350 | −32.71 | 1.68 | 19.2 | −47.2994 |
| S4 | Aspheric | −3.9598 | 0.2456 | | | | −67.3259 |
| S5 | Aspheric | 15.3970 | 0.4654 | 21.30 | 1.55 | 56.1 | 70.2448 |
| S6 | Aspheric | −46.9994 | 0.4709 | | | | −99.0000 |
| S7 | Aspheric | −18.1031 | 0.3433 | −24.58 | 1.62 | 25.9 | 80.0843 |
| S8 | Aspheric | 96.2967 | 0.6044 | | | | 99.0000 |
| S9 | Aspheric | 7.4665 | 1.2939 | 5.48 | 1.55 | 56.1 | 0.7384 |
| S10 | Aspheric | −4.6788 | 0.5122 | | | | −1.0514 |
| S11 | Aspheric | 7.2977 | 0.4932 | −3.94 | 1.54 | 55.6 | 0.3873 |
| S12 | Aspheric | 1.6022 | 0.6677 | | | | −0.9829 |
| S13 | Spherical | Infinite | 0.2100 | | 1.51 | 64.2 | |
| S14 | Spherical | Infinite | 0.2822 | | | | |
| S15 | Spherical | Infinite | | | | | |

As shown in Table 8, in Embodiment 3, a total effective focal length f of the optical imaging lens assembly is 5.41 mm. TTL is a distance from the object-side surface S1 of the first lens E1 to the imaging surface S15 of the optical imaging lens assembly on the optical axis, and TTL is 7.10 mm. ImgH is a half of a diagonal length of an effective pixel region of an electronic photosensitive element of the optical imaging lens assembly, and ImgH is 5.31 mm. Semi-FOV is a half of a maximum field of view of the optical imaging lens assembly, and Semi-FOV is 42.8°. Explanations about parameters of each relational expression are the same as those in Embodiment 1. Numerical values of each relational expression are listed in the following Table.

TABLE 8

| Embodiment 3 | | | |
|---|---|---|---|
| f(mm) | 5.41 | f1(mm) | 6.15 |
| TTL(mm) | 7.10 | ImgH(mm) | 5.31 |
| Semi-FOV(°) | 42.8 | Fno | 1.8 |
| TTL/ImgH | 1.34 | f3/f | 3.94 |
| |R3/f| | 0.61 | |f1/f| + |f2/f| + |f3/f| | 11.12 |
| f2/f1 | −5.32 | |f3/R5| | 1.38 |
| CT3/T34 | 0.99 | ΣCT/ΣAT | 1.55 |
| f×tan(Semi-FOV)(mm) | 5.01 | SAG41/SAG31 | 3.69 |
| CT3/ET3 | 2.24 | |SAG41 + SAG42|/CT4 | 2.92 |

In Embodiment 3, both the object-side surface and the image-side surface of any lens in the first lens E1 to the sixth lens E6 are aspheric surfaces. Table 9 shows high-order coefficients A4, A6, A8, A10, A12, A14, A16, A18, A20, A22, A24, A26, A28 and A30 that may be used for each of the aspheric mirror surfaces S1-S12 in Embodiment 3.

TABLE 9

| Surface number | A4 | A6 | A8 | A10 | A12 | A14 | A16 |
|---|---|---|---|---|---|---|---|
| S1 | −1.5255E−02 | −9.0389E−03 | −3.4682E−03 | −4.6083E−04 | −2.1879E−04 | 6.9117E−05 | −4.4312E−05 |
| S2 | −8.7305E−02 | −1.5850E−02 | −9.3626E−04 | −1.7051E−04 | −1.5282E−04 | −1.2469E−04 | 1.1269E−05 |
| S3 | 2.6917E−02 | 4.6197E−02 | −5.2827E−03 | 1.7548E−03 | −1.8593E−03 | 6.7175E−05 | −2.7017E−04 |
| S4 | 1.2366E−01 | 4.8020E−02 | 2.4017E−03 | 2.3892E−03 | −9.6043E−04 | −2.9157E−04 | −4.1618E−04 |
| S5 | −2.1772E−01 | −2.6218E−02 | 3.9798E−03 | 3.5193E−03 | 2.0774E−03 | 8.7939E−04 | 1.0260E−04 |
| S6 | −3.3858E−01 | −3.2002E−02 | 3.4943E−04 | 1.0046E−03 | 4.3893E−04 | 4.9032E−04 | 5.7436E−05 |
| S7 | −4.5629E−01 | 8.1301E−02 | 2.2774E−03 | −1.9431E−03 | −3.0245E−03 | 1.0172E−03 | −1.3949E−04 |
| S8 | −6.5652E−01 | 1.6571E−01 | −1.2381E−02 | −3.2744E−03 | −3.7234E−03 | 1.2192E−03 | −1.0568E−03 |
| S9 | −9.9832E−01 | 9.3151E−03 | 3.1193E−03 | 2.9784E−02 | −4.9829E−03 | −4.4651E−03 | −3.4483E−03 |
| S10 | 4.2164E−01 | −1.7264E−01 | −2.7843E−02 | 5.1810E−02 | −2.6053E−02 | 4.4437E−03 | −4.9184E−03 |
| S11 | −2.8101E+00 | 1.1562E+00 | −4.9477E−01 | 2.1751E−01 | −1.0069E−01 | 4.8716E−02 | −2.7307E−02 |
| S12 | −7.7632E+00 | 1.8243E+00 | −5.6984E−01 | 2.6366E−01 | −1.3852E−01 | 7.3817E−02 | −3.5391E−02 |

| Surface number | A18 | A20 | A22 | A24 | A26 | A28 | A30 |
|---|---|---|---|---|---|---|---|
| S1 | 4.0854E−05 | −1.9090E−05 | 1.8896E−05 | −1.1584E−05 | 6.8401E−06 | −1.4148E−05 | 6.7370E−06 |
| S2 | 1.3612E−05 | 3.1281E−05 | −5.6771E−06 | 6.0095E−07 | −1.2396E−05 | −3.7530E−06 | −9.8366E−06 |
| S3 | 1.2491E−04 | 1.2455E−05 | 4.7001E−05 | 1.0210E−06 | 1.5535E−05 | 4.9438E−07 | 4.8387E−06 |
| S4 | −1.2375E−04 | −2.1230E−05 | 1.6114E−05 | 2.8743E−05 | 9.5144E−07 | 6.9340E−06 | −1.2388E−05 |
| S5 | −1.2064E−04 | −1.7760E−04 | −9.0849E−05 | −5.1852E−05 | −2.9803E−06 | −4.5556E−06 | 1.0567E−05 |
| S6 | −1.7508E−04 | −1.9206E−04 | −1.4476E−04 | −7.0650E−05 | −4.0874E−05 | −1.0222E−05 | −1.1311E−05 |
| S7 | −3.5868E−04 | −2.5246E−04 | 3.3475E−05 | 5.3520E−06 | 1.2842E−05 | −1.7443E−05 | −4.2995E−07 |
| S8 | −5.1122E−04 | 1.6679E−04 | 3.1315E−04 | 7.5369E−05 | −2.4218E−05 | −2.7065E−05 | −1.3811E−05 |
| S9 | −5.7590E−04 | 1.4156E−03 | 1.1999E−03 | 3.6054E−04 | −1.5893E−04 | −2.5757E−04 | −1.0507E−04 |
| S10 | −5.3001E−03 | 1.3250E−03 | 1.6637E−03 | 1.3548E−03 | 5.3410E−04 | −1.6687E−04 | −1.7227E−04 |
| S11 | 1.0609E−02 | −6.4565E−04 | −4.1705E−05 | −6.2392E−04 | −1.7281E−04 | 7.1934E−04 | −2.9692E−04 |
| S12 | 1.7901E−02 | −1.1128E−02 | 4.1844E−03 | −2.1380E−03 | 1.3837E−03 | −4.9557E−04 | 3.8324E−04 |

Figure 6A:
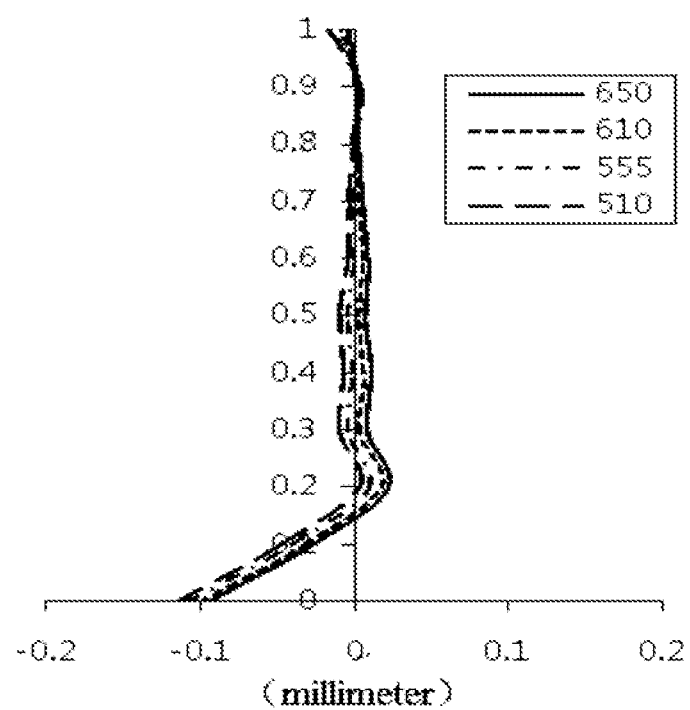
FIGS. 6a-6d show a longitudinal aberration curve, an astigmatism curve, a distortion curve and a lateral color curve of an optical imaging lens assembly according to Embodiment 3 of the disclosure respectively.
Figure 6B:
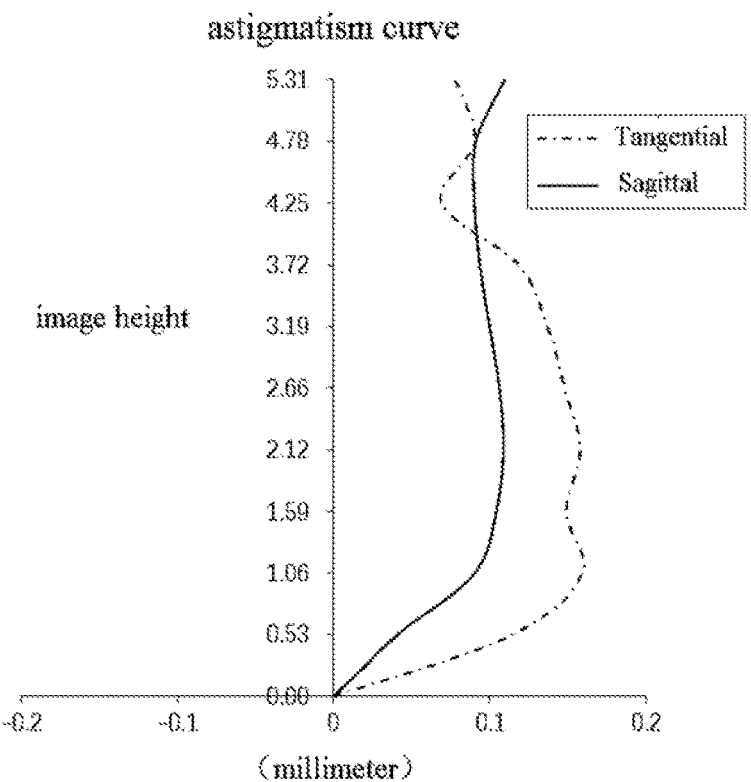
Figure 6C:
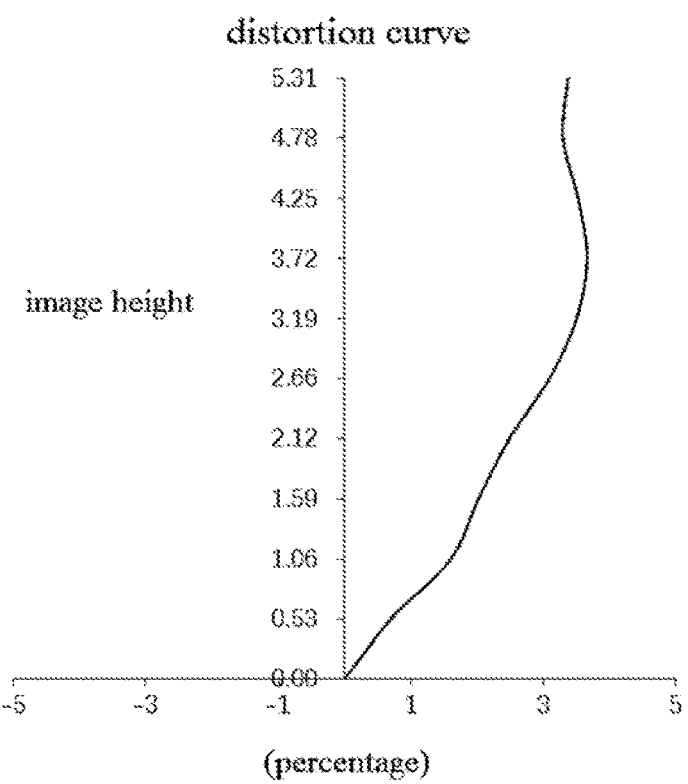
Figure 6D:
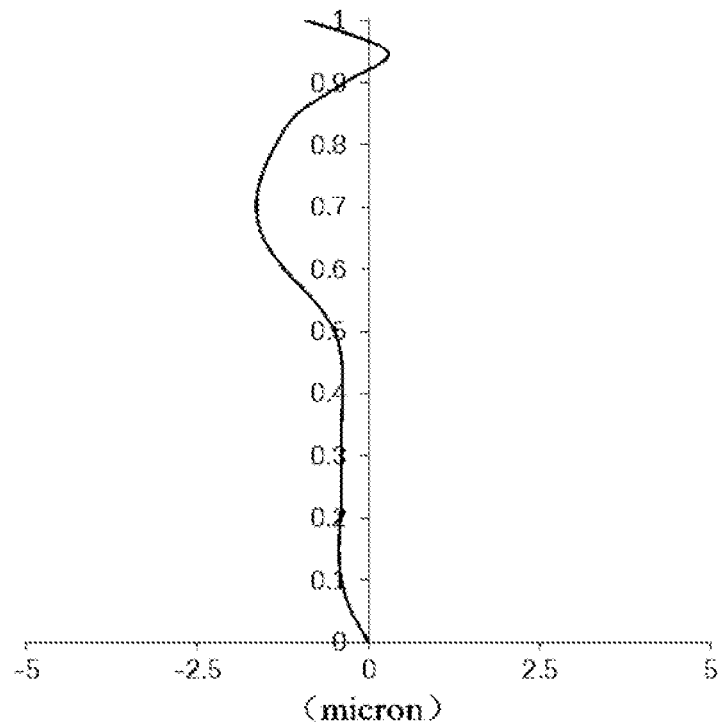

FIG. 6a shows a longitudinal aberration curve of the optical imaging lens assembly according to Embodiment 3 to represent deviations of a convergence focal point after light with different wavelengths passes through the lens. FIG. 6b shows an astigmatism curve of the optical imaging lens assembly according to Embodiment 3 to represent a tangential image surface curvature and a sagittal image surface curvature. FIG. 6c shows a distortion curve of the optical imaging lens assembly according to Embodiment 3 to represent distortion values corresponding to different image heights. FIG. 6d shows a lateral color curve of the optical imaging lens assembly according to Embodiment 3 to represent deviations of different image heights on the imaging surface after the light passes through the lens. According to FIGS. 6a-6d, it can be seen that the optical imaging lens assembly provided in Embodiment 3 may achieve high imaging quality.

Embodiment 4

Figure 7:
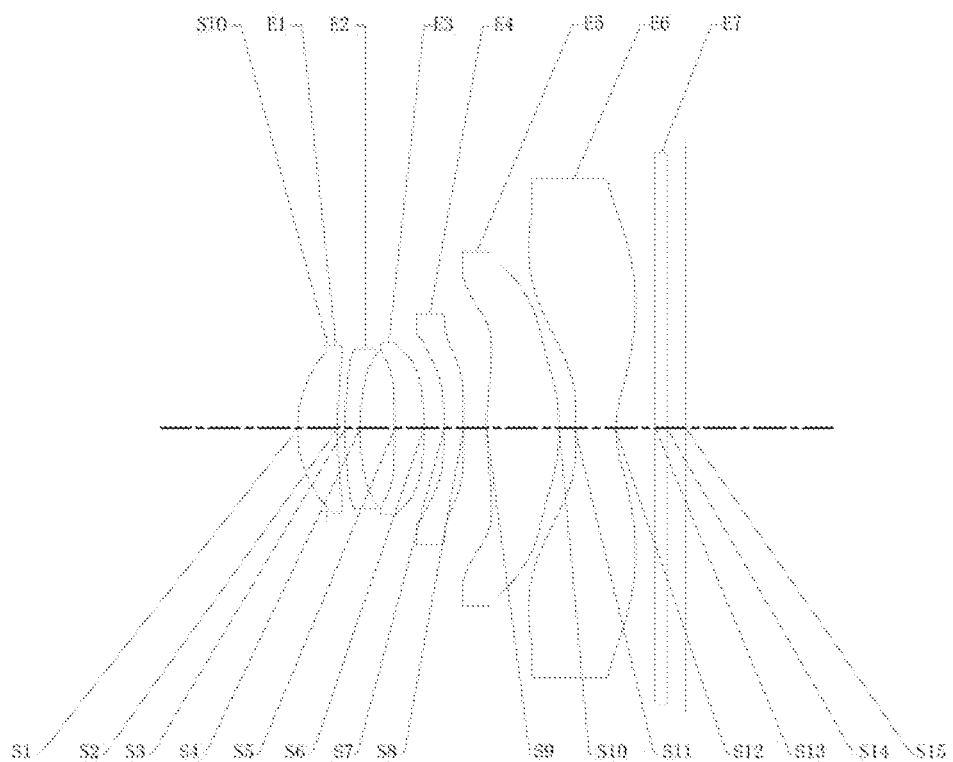
FIG. 7 shows a structural schematic diagram of a lens group of an optical imaging lens assembly according to Embodiment 4 of the disclosure.

FIG. 7 shows a structural schematic diagram of a lens group of an optical imaging lens assembly according to Embodiment 4 of the disclosure. The optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a convex surface, and an image-side surface S10 thereof is a convex surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially passes through each of the surfaces from S1 to S14, and is finally imaged on the imaging surface S15.

Table 10 shows a basic parameter table of the optical imaging lens assembly of Embodiment 4, wherein the units of the curvature radius, the thickness and the focal length are all millimeters (mm).

TABLE 10

| Surface number | Surface type | Curvature radius | Thickness/ distance | Focal length | Refractive index | Abbe number | Conic coefficient |
|---|---|---|---|---|---|---|---|
| OBJ | Spherical | Infinite | Infinite | | | | |
| STO | Spherical | Infinite | −0.5354 | | | | |
| S1 | Aspheric | 2.3159 | 0.7277 | 5.82 | 1.55 | 56.1 | 0.0201 |
| S2 | Aspheric | 7.5797 | 0.1354 | | | | 6.9641 |
| S3 | Aspheric | 5.8955 | 0.2729 | −23.72 | 1.68 | 19.2 | −33.9110 |
| S4 | Aspheric | 4.2326 | 0.6294 | | | | −9.8260 |
| S5 | Aspheric | −22.9938 | 0.5309 | 21.90 | 1.55 | 56.1 | −2.4333 |
| S6 | Aspheric | −7.9294 | 0.3665 | | | | −32.2781 |

TABLE 10-continued

| Surface number | Surface type | Curvature radius | Thickness/ distance | Focal length | Refractive index | Abbe number | Conic coefficient |
|---|---|---|---|---|---|---|---|
| S7 | Aspheric | −19.5569 | 0.3527 | −13.56 | 1.62 | 25.9 | 83.3715 |
| S8 | Aspheric | 14.8243 | 0.4211 | | | | 9.4572 |
| S9 | Aspheric | 5.3710 | 1.3162 | 4.71 | 1.55 | 56.1 | 0.3492 |
| S10 | Aspheric | −4.5010 | 0.2862 | | | | −0.0919 |
| S11 | Aspheric | 6.7761 | 0.7350 | −3.93 | 1.54 | 55.6 | 0.2020 |
| S12 | Aspheric | 1.5465 | 0.7327 | | | | −1.0011 |
| S13 | Spherical | Infinite | 0.2100 | | 1.51 | 64.2 | |
| S14 | Spherical | Infinite | 0.3472 | | | | |
| S15 | Spherical | Infinite | | | | | |

As shown in Table 11, in Embodiment 4, a total effective focal length f of the optical imaging lens assembly is 5.48 mm. TTL is a distance from the object-side surface S1 of the first lens E1 to the imaging surface S15 of the optical imaging lens assembly on the optical axis, and TTL is 7.06 mm. ImgH is a half of a diagonal length of an effective pixel region of an electronic photosensitive element of the optical imaging lens assembly, and ImgH is 5.31 mm. Semi-FOV is a half of a maximum field of view of the optical imaging lens assembly, and Semi-FOV is 43.07°. Explanations about parameters of each relational expression are the same as those in Embodiment 1. Numerical values of each relational expression are listed in the following Table.

TABLE 11

| Embodiment 4 | | | |
|---|---|---|---|
| f(mm) | 5.48 | f1(mm) | 5.82 |
| TTL(mm) | 7.06 | ImgH(mm) | 5.31 |

TABLE 11-continued

| Embodiment 4 | | | |
|---|---|---|---|
| Semi-FOV(°) | 43.07 | Fno | 1.8 |
| TTL/ImgH | 1.33 | f3/f | 4.00 |
| |R3/f| | 1.08 | |f1/f| + |f2/f| + |F3/f| | 9.39 |
| f2/f1 | −4.07 | |f3/R5| | 0.95 |
| CT3/T34 | 1.45 | ΣCT/ΣAT | 2.14 |
| f×tan(Semi-FOV)(mm) | 5.12 | SAG41/SAG31 | 2.07 |
| CT3/ET3 | 1.90 | |SAG41 + SAG42|/CT4 | 2.35 |

In Embodiment 4, both the object-side surface and the image-side surface of any lens in the first lens E1 to the sixth lens E6 are aspheric surfaces. Table 12 shows high-order coefficients A4, A6, A8, A10, A12, A14, A16, A18, A20, A22, A24, A26, A28 and A30 that may be used for each of the aspheric mirror surfaces S1-S12 in Embodiment 4.

TABLE 12

| Surface number | A4 | A6 | A8 | A10 | A12 | A14 | A16 |
|---|---|---|---|---|---|---|---|
| S1 | 4.0180E−03 | −1.7434E−03 | −2.2201E−03 | −4.8730E−04 | −3.2816E−04 | 1.2172E−05 | −6.3799E−05 |
| S2 | −7.6528E−02 | 1.9022E−03 | −2.3065E−03 | −2.1294E−04 | −6.3361E−05 | −4.9064E−05 | 2.8183E−06 |
| S3 | −7.4376E−03 | 1.7790E−02 | 4.0838E−04 | 7.5734E−04 | 4.6257E−05 | 1.7986E−05 | −4.8895E−05 |
| S4 | 6.6796E−02 | 1.8715E−02 | 3.2592E−03 | 1.4684E−03 | 6.1561E−04 | 2.1329E−04 | 1.1099E−04 |
| S5 | −1.8017E−01 | −1.8733E−02 | 1.2789E−03 | 2.0372E−03 | 1.7725E−03 | 9.8312E−04 | 6.4401E−04 |
| S6 | −3.1357E−01 | −1.5793E−02 | −1.0944E−02 | −7.5742E−04 | −7.6170E−05 | −1.0699E−05 | 1.9168E−04 |
| S7 | −4.1788E−01 | 8.4453E−02 | −3.8307E−03 | −5.7254E−03 | −3.1946E−03 | 4.0608E−04 | 6.5314E−06 |
| S8 | −6.9777E−01 | 2.2066E−01 | −2.8402E−02 | −1.0759E−02 | −2.4891E−03 | 3.5373E−03 | 2.0461E−04 |
| S9 | −1.4111E+00 | 1.1705E−01 | 5.5554E−02 | 2.5149E−03 | −2.2944E−02 | 2.0812E−03 | 5.9937E−03 |
| S10 | 2.4501E−01 | −9.0282E−02 | −1.1724E−02 | 5.0386E−02 | −3.6141E−02 | 1.0605E−02 | −2.2221E−03 |
| S11 | −2.8234E+00 | 1.1500E+00 | −5.1213E−01 | 2.3009E−01 | −1.0529E−01 | 4.9734E−02 | −2.6704E−02 |
| S12 | −8.1352E+00 | 1.8540E+00 | −6.1171E−01 | 2.7370E−01 | −1.2587E−01 | 6.9127E−02 | −3.9307E−02 |

| Surface | A18 | A20 | A22 | A24 | A26 | A28 | A30 |
|---|---|---|---|---|---|---|---|
| S1 | 3.2119E−05 | −2.7236E−05 | 1.6860E−05 | −1.1116E−05 | 9.6453E−06 | −8.8379E−06 | 3.0793E−06 |
| S2 | −2.2847E−05 | 4.6834E−06 | −1.2215E−05 | 8.6256E−06 | −3.7051E−06 | 7.7619E−06 | −2.2008E−06 |
| S3 | 2.4199E−07 | −2.3140E−05 | 5.7137E−06 | −6.2198E−06 | 9.6713E−06 | −2.6180E−06 | 7.0398E−06 |
| S4 | 3.0904E−05 | 2.7409E−05 | 8.2847E−06 | 2.0277E−05 | 6.0579E−06 | 1.0022E−05 | −2.2788E−06 |
| S5 | 3.0879E−04 | 1.8312E−04 | 7.2178E−05 | 3.7678E−05 | 5.4150E−06 | −2.6943E−07 | −2.6490E−06 |
| S6 | 1.3538E−05 | 6.7438E−05 | −5.5755E−06 | 2.5631E−05 | −3.9579E−06 | 1.5672E−05 | −1.2849E−06 |
| S7 | −1.6407E−04 | −1.0499E−04 | 7.8080E−06 | −9.4001E−06 | −5.7033E−07 | −7.6352E−06 | 6.1393E−06 |
| S8 | −3.2383E−04 | −3.3849E−05 | 5.3883E−05 | −2.4252E−05 | −1.7511E−05 | 1.4524E−06 | 1.3308E−06 |
| S9 | 8.6826E−04 | −1.1652E−03 | −9.9454E−04 | −2.3029E−05 | 2.9165E−04 | 8.4441E−05 | −1.6911E−05 |
| S10 | −3.3873E−03 | 8.0474E−04 | 1.0075E−03 | −1.7997E−05 | 5.4174E−04 | −1.1958E−04 | −9.7266E−05 |
| S11 | 1.2197E−02 | −1.9495E−03 | −1.5520E−03 | 7.0917E−04 | 3.8258E−04 | −3.8271E−04 | 8.5992E−05 |
| S12 | 1.7378E−02 | −9.4759E−03 | 4.2912E−03 | −1.8086E−03 | 1.5953E−03 | −1.2597E−03 | 3.9103E−04 |

Figure 8A:
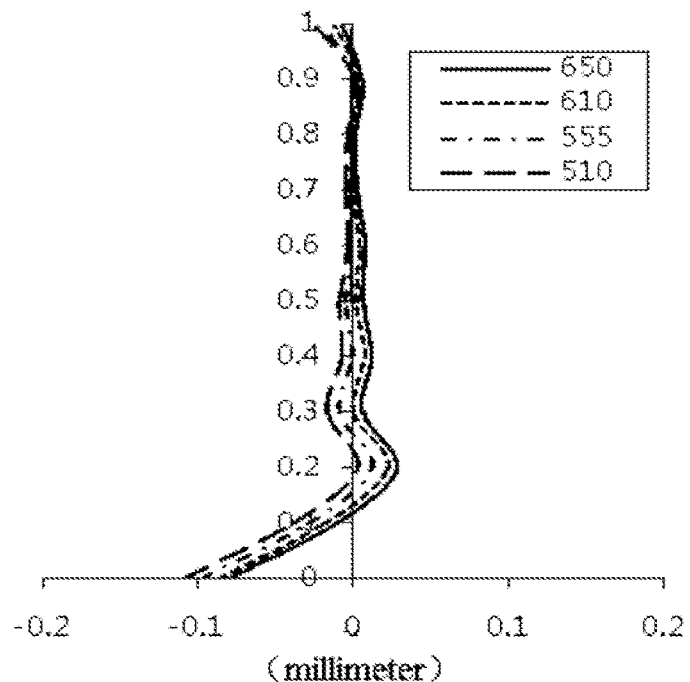
FIGS. 8a-8d show a longitudinal aberration curve, an astigmatism curve, a distortion curve and a lateral color curve of an optical imaging lens assembly according to Embodiment 4 of the disclosure respectively.
Figure 8B:
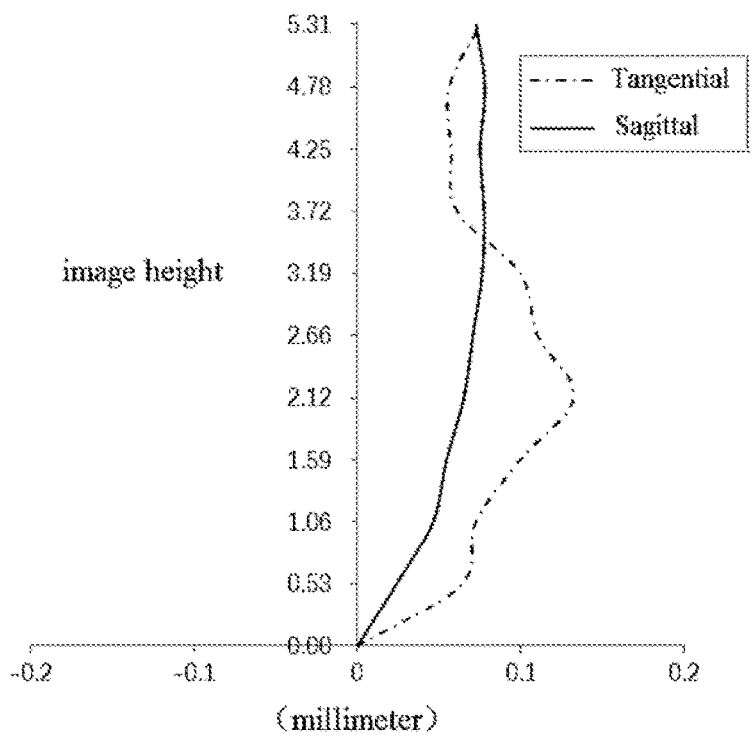
Figure 8C:
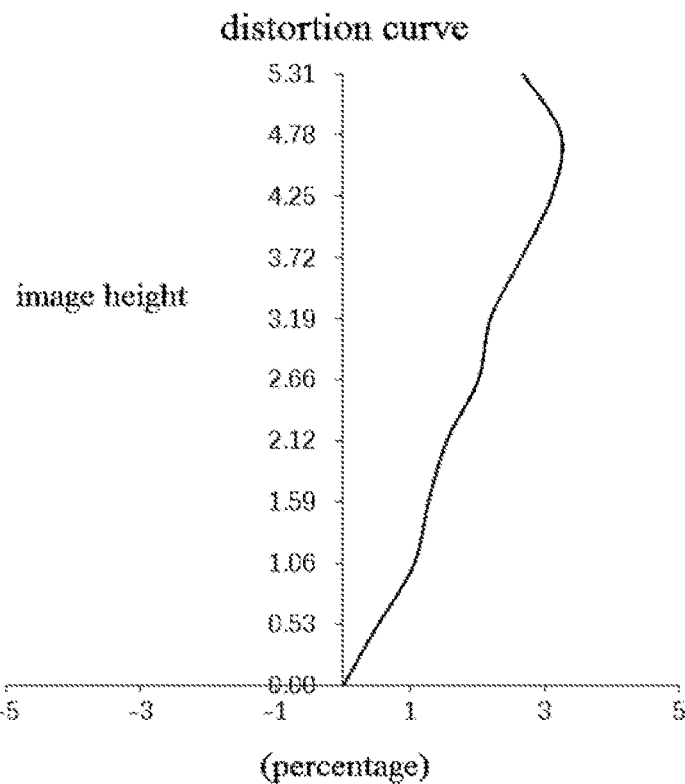
Figure 8D:
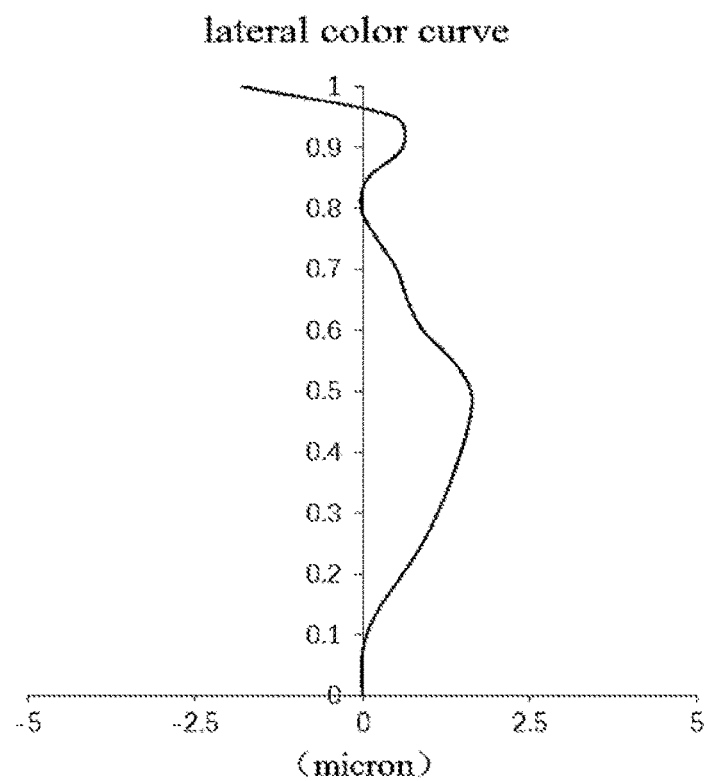

FIG. 8a shows a longitudinal aberration curve of the optical imaging lens assembly according to Embodiment 4 to represent deviations of a convergence focal point after light with different wavelengths passes through the lens. FIG. 8b shows an astigmatism curve of the optical imaging lens assembly according to Embodiment 4 to represent a tangential image surface curvature and a sagittal image surface curvature. FIG. 8c shows a distortion curve of the optical imaging lens assembly according to Embodiment 4 to represent distortion values corresponding to different image heights. FIG. 8d shows a lateral color curve of the optical imaging lens assembly according to Embodiment 4 to represent deviations of different image heights on the imaging surface after the light passes through the lens. According to FIGS. 8a-8d, it can be seen that the optical imaging lens assembly provided in Embodiment 4 may achieve high imaging quality.

convex surface, and an image-side surface S10 thereof is a concave surface. The sixth lens E6 has a negative refractive power, an object-side surface S11 thereof is a convex surface, and an image-side surface S12 thereof is a concave surface. An optical filter E7 has an object-side surface S13 and an image-side surface S14. Light from an object sequentially passes through each of the surfaces from S1 to S14, and is finally imaged on the imaging surface S15.

Table 13 shows a basic parameter table of the optical imaging lens assembly of Embodiment 5, wherein the units of the curvature radius, the thickness and the focal length are all millimeters (mm).

TABLE 13

| Surface number | Surface type | Curvature radius | Thickness/ distance | Focal length | Refractive index | Abbe number | Conic coefficient |
|---|---|---|---|---|---|---|---|
| OBJ | Spherical | Infinite | Infinite | | | | |
| STO | Spherical | Infinite | −0.4627 | | | | |
| S1 | Aspheric | 2.3504 | 0.6618 | 5.53 | 1.55 | 56.1 | −0.0584 |
| S2 | Aspheric | 9.5423 | 0.1531 | | | | 9.6981 |
| S3 | Aspheric | 7.6879 | 0.3688 | −15.65 | 1.68 | 19.2 | −51.5485 |
| S4 | Aspheric | 4.3701 | 0.5911 | | | | −8.3736 |
| S5 | Aspheric | −48.9928 | 0.6090 | 13.92 | 1.55 | 56.1 | 76.7842 |
| S6 | Aspheric | −6.6063 | 0.2927 | | | | −13.0566 |
| S7 | Aspheric | −18.9944 | 0.3527 | −17.07 | 1.62 | 25.9 | −99.0000 |
| S8 | Aspheric | 24.0199 | 0.5095 | | | | 91.1324 |
| S9 | Aspheric | 2.5399 | 0.7145 | 9.43 | 1.55 | 56.1 | −1.3199 |
| S10 | Aspheric | 4.5164 | 0.7012 | | | | −49.9936 |
| S11 | Aspheric | 4.7328 | 0.8580 | −5.41 | 1.54 | 55.6 | 0.1042 |
| S12 | Aspheric | 1.6850 | 0.5169 | | | | −0.9851 |
| S13 | Spherical | Infinite | 0.2100 | | 1.51 | 64.2 | |
| S14 | Spherical | Infinite | 0.1314 | | | | |
| S15 | Spherical | Infinite | | | | | |

Embodiment 5

Figure 9:
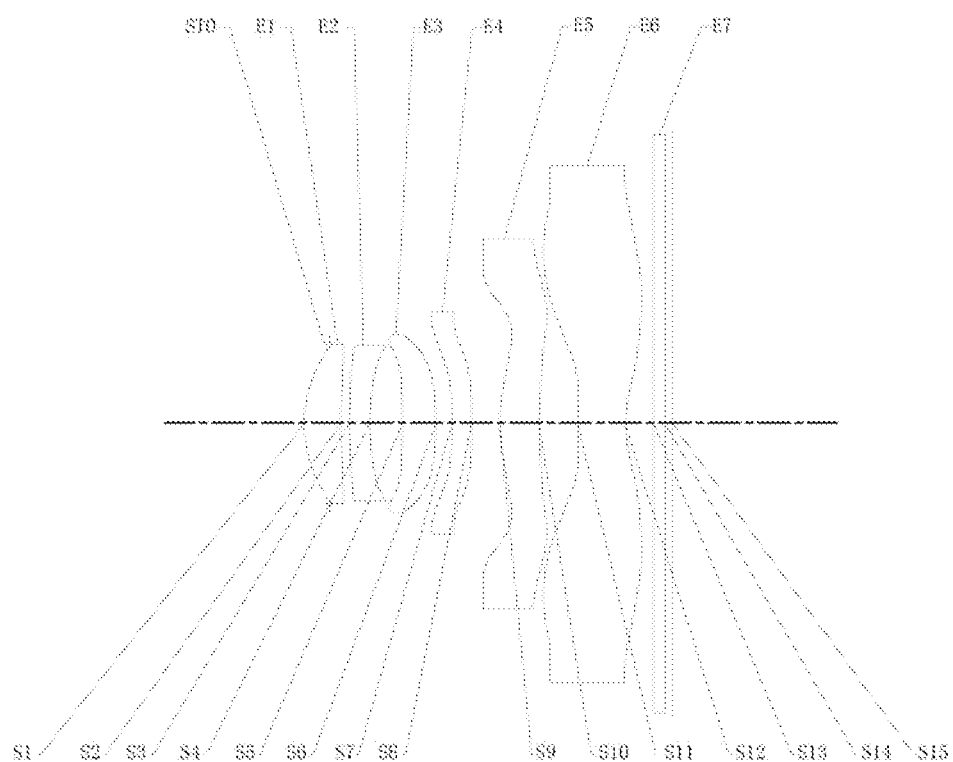
FIG. 9 shows a structural schematic diagram of a lens group of an optical imaging lens assembly according to Embodiment 5 of the disclosure.

FIG. 9 shows a structural schematic diagram of a lens group of an optical imaging lens assembly according to Embodiment 5 of the disclosure. The optical imaging lens assembly sequentially includes from an object side to an image side along an optical axis: a diaphragm STO, a first lens E1, a second lens E2, a third lens E3, a fourth lens E4, a fifth lens E5, a sixth lens E6, an optical filter E7 and an imaging surface S15.

The first lens E1 has a positive refractive power, an object-side surface S1 thereof is a convex surface, and an image-side surface S2 thereof is a concave surface. The second lens E2 has a negative refractive power, an object-side surface S3 thereof is a convex surface, and an image-side surface S4 thereof is a concave surface. The third lens E3 has a positive refractive power, an object-side surface S5 thereof is a concave surface, and an image-side surface S6 thereof is a convex surface. The fourth lens E4 has a negative refractive power, an object-side surface S7 thereof is a concave surface, and an image-side surface S8 thereof is a concave surface. The fifth lens E5 has a positive refractive power, an object-side surface S9 thereof is a As shown in Table 14, in Embodiment 5, a total effective focal length f of the optical imaging lens assembly is 5.11 mm. TTL is a distance from the object-side surface S1 of the first lens E1 to the imaging surface S15 of the optical imaging lens assembly on the optical axis, and TTL is 6.67 mm. ImgH is a half of a diagonal length of an effective pixel region of an electronic photosensitive element of the optical imaging lens assembly, and ImgH is 5.31 mm. Semi-FOV is a half of a maximum field of view of the optical imaging lens assembly, and Semi-FOV is 42.22°. Explanations about parameters of each relational expression are the same as those in Embodiment 1. Numerical values of each relational expression are listed in the following Table.

TABLE 14

| Embodiment 5 | | | |
|---|---|---|---|
| f(mm) | 5.11 | f1(mm) | 5.53 |
| TTL(mm) | 6.67 | ImgH(mm) | 5.31 |
| Semi-FOV(°) | 42.22 | Fno | 1.8 |
| TTL/ImgH | 1.26 | f3/f | 2.72 |
| |R3/f| | 1.50 | |f1/f| + |f2/f| + |f3/f| | 6.87 |
| f2/f1 | −2.83 | |f3/R5| | 0.28 |
| CT3/T34 | 2.08 | ΣCT/ΣAT | 1.59 |
| f×tan(Semi-FOV)(mm) | 4.64 | SAG41/SAG31 | 1.71 |
| CT3/ET3 | 2.35 | |SAG41 + SAG42|/CT4 | 1.96 |

In Embodiment 5, both the object-side surface and the image-side surface of any lens in the first lens E1 to the sixth lens E6 are aspheric surfaces. Table 15 shows high-order coefficients A4, A6, A8, A10, A12, A14, A16, A18, A20, A22, A24, A26, A28 and A30 that may be used for each of the aspheric mirror surfaces S1-S12 in Embodiment 5.

TABLE 15

| Surface number | A4 | A6 | A8 | A10 | A12 | A14 | A16 |
|---|---|---|---|---|---|---|---|
| S1 | 2.1604E−03 | −1.1576E−03 | −1.1698E−03 | −1.5427E−04 | −1.4425E−04 | 2.7686E−05 | −4.0368E−05 |
| S2 | −5.4553E−02 | 2.4064E−03 | −1.3333E−03 | −1.7441E−04 | −1.8733E−06 | −5.2910E−05 | 1.9505E−05 |
| S3 | −2.1553E−02 | 1.1752E−02 | −8.1191E−04 | 2.3845E−04 | −5.2061E−05 | 5.8426E−06 | −2.4997E−05 |
| S4 | 5.1640E−02 | 1 3840E−02 | 1.3232E−03 | 4.4590E−04 | 1.6920E−04 | −1.0848E−05 | 2.4145E−05 |
| S5 | −1.6779E−01 | −1.5667E−02 | −5.7123E−04 | 5.2454E−04 | 4.7160E−04 | 2.2141E−04 | 9.6429E−05 |
| S6 | −3.5308E−01 | −2.1573E−02 | −3.4615E−03 | −3.2317E−03 | −6.4386E−04 | −4.4292E−04 | −5.4466E−05 |
| S7 | −3.7555E−01 | 9.6944E−02 | −5.3755E−03 | −4.8061E−03 | −1.8242E−03 | 5.7481E−04 | −2.5270E−04 |
| S8 | −5.9687E−01 | 1.9077E−01 | −1.9652E−02 | −1.4572E−03 | −4.5935E−03 | 2.0782E−03 | 1.5848E−04 |
| S9 | −1.8117E+00 | 1.5928E−01 | 5.2991E−02 | 3.6699E−02 | −3.4496E−02 | 2.2168E−03 | 3.0623E−03 |
| S10 | −5.6433E−01 | 4.1391E−02 | 3.4272E−02 | 1.6390E−02 | −3.9214E−02 | 2.3601E−02 | −7.8412E−03 |
| S11 | −3.3511E+00 | 1.1389E+00 | −5.4210E−01 | 2.4412E−01 | −1.1488E−01 | 5.3546E−02 | −2.5638E−02 |
| S12 | −7.7201E+00 | 1.8273E+00 | −6.0448E−01 | 2.6329E−01 | −1.2542E−01 | 7.4763E−02 | −4.3292E−02 |

| Surface number | A18 | A20 | A22 | A24 | A26 | A28 | A30 |
|---|---|---|---|---|---|---|---|
| S1 | 2.0720E−05 | −2.0582E−05 | 1.4806E−05 | −5.3689E−06 | 8.4511E−06 | −8.2685E−06 | 2.2190E−06 |
| S2 | −2.3124E−05 | 1.0631E−05 | −1.2936E−05 | 8.9241E−06 | −7.6685E−06 | 6.0043E−06 | −1.2519E−06 |
| S3 | 1.1077E−05 | −9.8819E−06 | 9.5699E−06 | −6.0691E−06 | 6.7158E−06 | −7.7690E−06 | 3.3058E−06 |
| S4 | −2.1424E−05 | 1.0726E−05 | −5.8783E−06 | 1.1500E−05 | −1.2999E−06 | 8.1522E−06 | −4.8650E−06 |
| S5 | 8.2622E−05 | 3.6267E−05 | 3.7512E−05 | 9.0309E−06 | 1.0342E−05 | −6.8510E−06 | 6.1681E−08 |
| S6 | −6.5065E−05 | 5.8662E−05 | 8.9971E−06 | 3.2486E−05 | 6.7059E−06 | 2.2533E−05 | 1.5083E−06 |
| S7 | 8.4418E−05 | 4.9498E−06 | 2.5784E−05 | −1.4183E−05 | 1.6638E−05 | 3.1406E−06 | 8.6152E−07 |
| S8 | 6.8086E−04 | 8.2966E−05 | 2.8503E−05 | −4.9847E−05 | −7.0547E−06 | −7.9540E−06 | −1.7372E−05 |
| S9 | 3.0835E−03 | −6.1411E−04 | −1.0646E−03 | −6.1632E−04 | 2.3342E−04 | 1.7981E−04 | 1.6892E−05 |
| S10 | 8.9815E−04 | 6.6562E−04 | −1.3137E−04 | 3.7721E−04 | 2.4848E−05 | −4.6881E−04 | 2.1755E−04 |
| S11 | 1.0585E−02 | −1.6108E−03 | −1.8024E−03 | 9.4864E−04 | 4.1049E−04 | −5.6335E−04 | 1.6358E−04 |
| S12 | 1.6366E−02 | −6.2314E−03 | 4.1510E−03 | −3.7950E−03 | 2.4575E−03 | −1.1963E−03 | 3.2583E−04 |

Figure 10A:
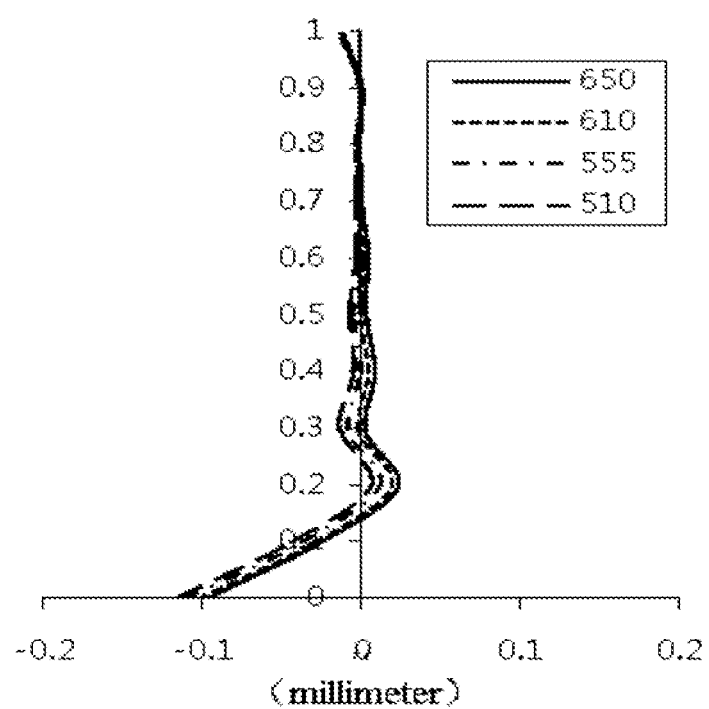
FIGS. 10a-10d show a longitudinal aberration curve, astigmatism curve, distortion curve and lateral color curve of an optical imaging lens assembly according to Embodiment 5 of the disclosure respectively.
Figure 10B:
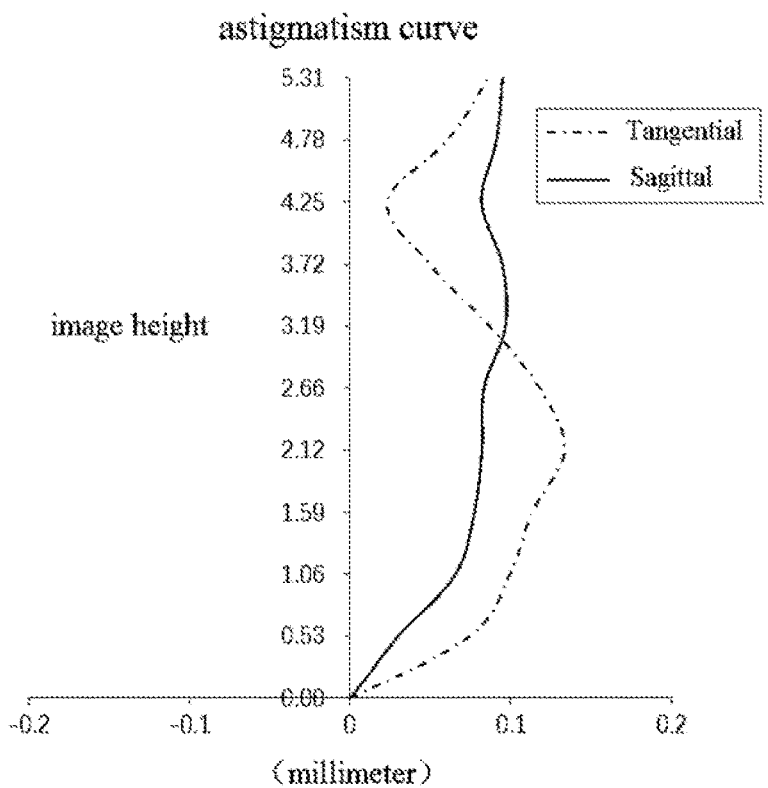
Figure 10C:
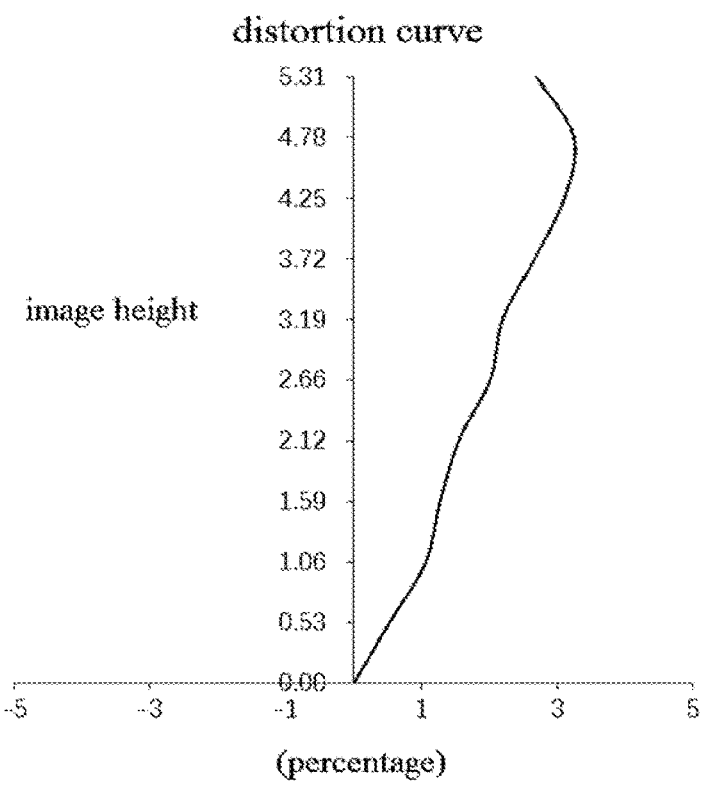
Figure 10D:
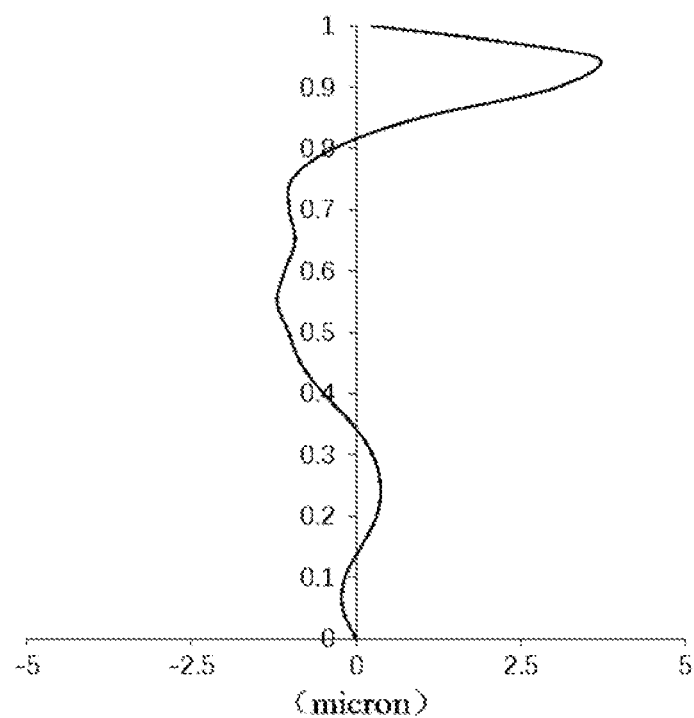

FIG. 10a shows a longitudinal aberration curve of the optical imaging lens assembly according to Embodiment 5 to represent deviations of a convergence focal point after light with different wavelengths passes through the lens. FIG. 10b shows an astigmatism curve of the optical imaging lens assembly according to Embodiment 5 to represent a tangential image surface curvature and a sagittal image surface curvature. FIG. 10c shows a distortion curve of the optical imaging lens assembly according to Embodiment 5 to represent distortion values corresponding to different image heights. FIG. 10d shows a lateral color curve of the optical imaging lens assembly according to Embodiment 5 to represent deviations of different image heights on the imaging surface after the light passes through the lens. According to FIGS. 10a-10d, it can be seen that the optical imaging lens assembly provided in Embodiment 5 may achieve high imaging quality.

The above is only the preferred embodiment of the disclosure and are not intended to limit the disclosure. Any modifications, improvements, equivalent replacements and the like made within the spirit and principle of the disclosure shall fall within the scope of protection of the disclosure.

What is claimed is:

1. An optical imaging lens assembly, sequentially comprising from an object side to an image side along an optical axis:
   a first lens;
   a second lens with a negative refractive power;
   a third lens, wherein an image-side surface thereof is a convex surface;
   a fourth lens with a negative refractive power, wherein an object-side surface thereof is a concave surface, and an image-side surface thereof is a concave surface;
   a fifth lens; and
   a sixth lens;
   wherein TTL is an on-axis distance from an object-side surface of the first lens to an imaging surface, ImgH is a half of a diagonal length of an effective pixel region on the imaging surface, and TTL and ImgH satisfy: TTL/ImgH≤1.35; and an effective focal length f3 of the third lens and an effective focal length f of the optical imaging lens assembly satisfy: 2.5≤f3/f≤4.0.

2. The optical imaging lens assembly according to claim 1, wherein an effective focal length f2 of the second lens and an effective focal length f1 of the first lens satisfy: −6.0≤f2/f1≤−2.5.

3. The optical imaging lens assembly according to claim 1, wherein the effective focal length f3 of the third lens and a curvature radius R5 of an object-side surface of the third lens satisfy: |f3/R5|≤1.5.

4. The optical imaging lens assembly according to claim 1, wherein a center thickness CT3 of the third lens on the optical axis and an air space T34 between the third lens and the fourth lens on the optical axis satisfy: 0.5≤CT3/T34≤2.5.

5. The optical imaging lens assembly according to claim 1, wherein ΣCT is a sum of center thicknesses of all the lenses on the optical axis, ΣAT is a sum of air spaces between any two adjacent lenses with refractive power in the first lens to the lens closest to the imaging surface on the optical axis, and ΣCT and ΣAT satisfy: 1.0≤ΣCT/ΣAT≤2.5.

6. The optical imaging lens assembly according to claim 1, wherein Semi-FOV is a half of a maximum field of view of the optical imaging lens assembly, and the effective focal length f of the optical imaging lens assembly and Semi-FOV satisfy: 4.0 mm≤f×tan(Semi-FOV)≤5.5 mm.

7. The optical imaging lens assembly according to claim 1, wherein SAG41 is an on-axis distance between an intersection point of the object-side surface of the fourth lens and the optical axis to an effective radius vertex of the object-side surface of the fourth lens, SAG31 is an on-axis distance between an intersection point of an object-side surface of the third lens and the optical axis to an effective radius vertex of the object-side surface of the third lens, and SAG41 and SAG31 satisfy: 1.5≤SAG41/SAG31≤4.0.

8. The optical imaging lens assembly according to claim 1, wherein a center thickness CT3 of the third lens on the optical axis and an edge thickness ET3 of the third lens satisfy: $1.5 \leq CT3/ET3 \leq 2.5$.

9. The optical imaging lens assembly according to claim 1, wherein SAG41 is an on-axis distance between an intersection point of the object-side surface of the fourth lens and the optical axis to an effective radius vertex of the object-side surface of the fourth lens, SAG42 is an on-axis distance between an intersection point of the image-side surface of the fourth lens and the optical axis to an effective radius vertex of the image-side surface of the fourth lens, and SAG41, SAG42 and a center thickness CT4 of the fourth lens on the optical axis satisfy $1.5 \leq |SAG41+SAG42|/CT4 \leq 3.0$.

10. The optical imaging lens assembly according to claim 1, wherein an object-side surface of the sixth lens is a convex surface, and an image-side surface of the sixth lens is a concave surface.

11. An optical imaging lens assembly, sequentially comprising from an object side to an image side along an optical axis:
a first lens;
a second lens with a negative refractive power;
a third lens with a positive refractive power, wherein an image-side surface thereof is a convex surface;
a fourth lens with a negative refractive power, wherein an object-side surface thereof is a concave surface, and an image-side surface thereof is a concave surface;
a fifth lens; and
a sixth lens,
wherein TTL is an on-axis distance from an object-side surface of the first lens to an imaging surface, ImgH is a half of a diagonal length of an effective pixel region on the imaging surface, and TTL and ImgH satisfy: $TTL/ImgH \leq 1.35$; a curvature radius R3 of an object-side surface of the second lens and an effective focal length f of an optical imaging lens assembly satisfy: $|R3/f| \leq 1.55$; and an effective focal length f1 of the first lens, an effective focal length f2 of the second lens, an effective focal length f3 of the third lens and the effective focal length f of the optical imaging lens assembly satisfy: $6.5 \leq |f1/f|+|f2/f|+|f3/f| \leq 11.5$; and
the effective focal length f2 of the second lens and the effective focal length f1 of the first lens satisfy: $-6.0 \leq f2/f1 \leq -2.5$.

12. The optical imaging lens assembly according to claim 11, wherein the effective focal length f3 of the third lens and a curvature radius R5 of an object-side surface of the third lens satisfy: $|f3/R5| \leq 1.5$.

13. The optical imaging lens assembly according to claim 11, wherein a center thickness CT3 of the third lens on the optical axis and an air space T34 between the third lens and the fourth lens on the optical axis satisfy: $0.5 \leq CT3/T34 \leq 2.5$.

14. The optical imaging lens assembly according to claim 11, wherein ΣCT is a sum of center thicknesses of all the lenses on the optical axis, ΣAT is a sum of air spaces between any two adjacent lenses with refractive power in the first lens to the lens closest to the imaging surface on the optical axis, and ΣCT and ΣAT satisfy: $1.0 \leq \Sigma CT/\Sigma AT \leq 2.5$.

15. The optical imaging lens assembly according to claim 11, wherein Semi-FOV is a half of a maximum field of view of the optical imaging lens assembly, and the effective focal length f of the optical imaging lens assembly and Semi-FOV satisfy: $4.0 \text{ mm} \leq f \times \tan(\text{Semi-FOV}) \leq 5.5 \text{ mm}$.

16. The optical imaging lens assembly according to claim 11, wherein SAG41 is an on-axis distance between an intersection point of the object-side surface of the fourth lens and the optical axis to an effective radius vertex of the object-side surface of the fourth lens, SAG31 is an on-axis distance between an intersection point of an object-side surface of the third lens and the optical axis to an effective radius vertex of the object-side surface of the third lens, and SAG41 and SAG31 satisfy $1.5 \leq SAG41/SAG31 \leq 4.0$.

17. The optical imaging lens assembly according to claim 11, wherein a center thickness CT3 of the third lens on the optical axis and an edge thickness ET3 of the third lens satisfy $1.5 \leq CT3/ET3 \leq 2.5$.

18. The optical imaging lens assembly according to claim 11, wherein SAG41 is an on-axis distance between an intersection point of the object-side surface of the fourth lens and the optical axis to an effective radius vertex of the object-side surface of the fourth lens, SAG42 is an on-axis distance between an intersection point of the image-side surface of the fourth lens and the optical axis to an effective radius vertex of the image-side surface of the fourth lens, and SAG41, SAG42 and a center thickness CT4 of the fourth lens on the optical axis satisfy $1.5 \leq |SAG41+SAG42|/CT4 \leq 3.0$.

19. The optical imaging lens assembly according to claim 11, wherein an object-side surface of the sixth lens is a convex surface, and an image-side surface of the sixth lens is a concave surface.

\* \* \* \* \*